(12) United States Patent
Sato et al.

(10) Patent No.: US 11,789,543 B2
(45) Date of Patent: Oct. 17, 2023

(54) INFORMATION PROCESSING APPARATUS AND INFORMATION PROCESSING METHOD

(71) Applicant: SONY GROUP CORPORATION, Tokyo (JP)

(72) Inventors: Yugo Sato, Tokyo (JP); Atsushi Irie, Tokyo (JP); Kenji Gotoh, Tokyo (JP); Junji Otsuka, Tokyo (JP); Tetsuo Ikeda, Tokyo (JP); Eisuke Fujinawa, Tokyo (JP); Seishi Tomonaga, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 60 days.

(21) Appl. No.: 17/430,789

(22) PCT Filed: Feb. 7, 2020

(86) PCT No.: PCT/JP2020/004765
§ 371 (c)(1),
(2) Date: Aug. 13, 2021

(87) PCT Pub. No.: WO2020/170851
PCT Pub. Date: Aug. 27, 2020

(65) Prior Publication Data
US 2022/0137712 A1   May 5, 2022

(30) Foreign Application Priority Data
Feb. 22, 2019   (JP) ................................ 2019-030161

(51) Int. Cl.
*G06F 3/01* (2006.01)
*G06T 7/50* (2017.01)
(Continued)

(52) U.S. Cl.
CPC ............ *G06F 3/017* (2013.01); *G06F 3/0425* (2013.01); *G06T 7/20* (2013.01); *G06T 7/50* (2017.01);
(Continued)

(58) Field of Classification Search
CPC ...... G06F 3/017; G06F 3/0425; G06F 3/0416; G06F 2203/04104; G06F 3/0304;
(Continued)

(56) References Cited

U.S. PATENT DOCUMENTS

2006/0010400 A1* 1/2006 Dehlin .................. G06V 40/28
715/856
2009/0307589 A1 12/2009 Inose et al.
(Continued)

FOREIGN PATENT DOCUMENTS

CN   101599002 A   12/2009
CN   104813258 A   7/2015
(Continued)

OTHER PUBLICATIONS

International Search Report and Written Opinion of PCT Application No. PCT/JP2020/004765, dated Apr. 14, 2020, 11 pages of ISRWO.

*Primary Examiner* — Grant Sitta
(74) *Attorney, Agent, or Firm* — CHIP LAW GROUP

(57) ABSTRACT

The present disclosure relates to an information processing apparatus, an information processing method, and a program capable of, when accepting hand-based operation inputs from a plurality of users, performing appropriate pairing of left and right hands for each user.
An image of an operation surface from above is acquired, the operation surface being configured to accept a hand-based operation input from users, left and right hands of the users and arms corresponding to the respective hands are
(Continued)

detected from the image, a base position of one of the arms is set as a benchmark position, a base position of the arm that is closest adjacent along a periphery of the operation surface is set as a reference position when the one of the arms is a left hand, and pairing of the hand of the arm at the benchmark position and the hand of the arm at the reference position is performed. The present disclosure can be applied to an information processing system.

19 Claims, 26 Drawing Sheets

(51) Int. Cl.
  *G06T 7/70* (2017.01)
  *G06V 40/20* (2022.01)
  *G06F 3/042* (2006.01)
  *G06T 7/20* (2017.01)

(52) U.S. Cl.
  CPC ............... *G06T 7/70* (2017.01); *G06V 40/28* (2022.01); *G06T 2207/30181* (2013.01); *G06T 2207/30241* (2013.01)

(58) Field of Classification Search
  CPC ..... G06F 3/0488; G06F 3/04883; G06T 7/20; G06T 7/50; G06T 7/70; G06T 2207/30181; G06T 2207/30241; G06V 40/28
  See application file for complete search history.

(56) References Cited

U.S. PATENT DOCUMENTS

| | | | |
|---|---|---|---|
| 2012/0038496 A1* | 2/2012 | Edwards | G06F 3/023 341/34 |
| 2015/0302617 A1 | 10/2015 | Shimura et al. | |
| 2016/0093038 A1* | 3/2016 | Arai | G06T 7/90 382/103 |

FOREIGN PATENT DOCUMENTS

| | | |
|---|---|---|
| CN | 105468189 A | 4/2016 |
| EP | 3001350 A1 | 3/2016 |
| JP | 2009-294857 A | 12/2009 |
| JP | 4918872 B2 | 4/2012 |
| JP | 2014-115688 A | 6/2014 |
| JP | 2016-071546 A | 5/2016 |
| JP | 2016-076017 A | 5/2016 |
| JP | 2017-162126 A | 9/2017 |
| WO | 2014/080829 A1 | 5/2014 |

\* cited by examiner

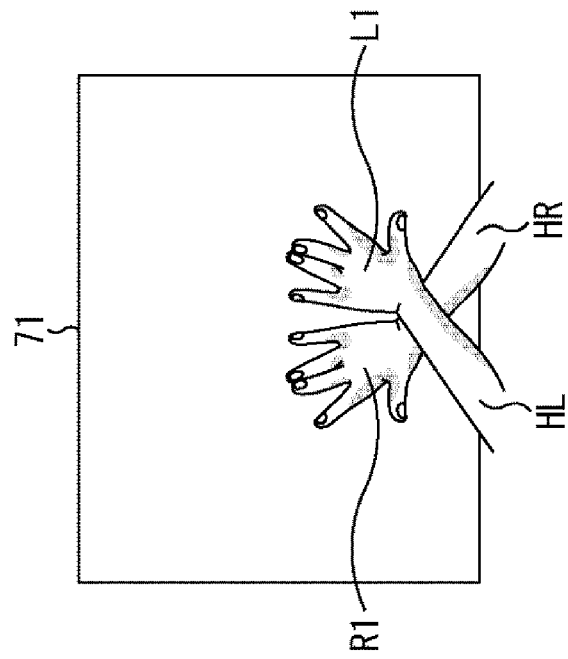
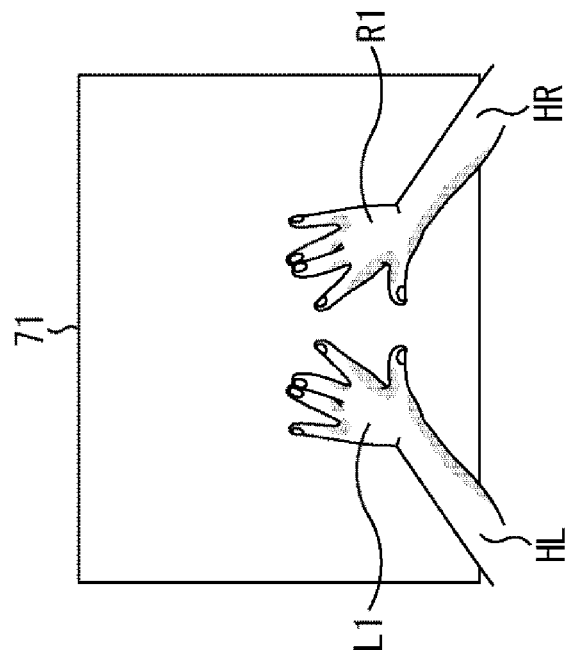
FIG. 9

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/004765 filed on Feb. 7, 2020, which claims priority benefit of Japanese Patent Application No. JP 2019-030161 filed in the Japan Patent Office on Feb. 22, 2019. Each of the above-referenced applications is hereby incorporated herein by reference in its entirety.

TECHNICAL FIELD

The present disclosure relates to an information processing apparatus, an information processing method, and a program, and particularly relates to an information processing apparatus, an information processing method, and a program capable of, when accepting hand-based operation inputs from a plurality of users, performing appropriate pairing of left and right hands for each user.

BACKGROUND ART

There has been proposed operation equipment that accepts an operation input for application software or the like in response to a touch operation on a touch panel or a gesture made with a hand such as holding a hand in space.

Here, in a case where gesture-based operation inputs are accepted, it is necessary to identify which hand belongs to which person when multiple persons intend to perform operations.

Thus, there has been proposed a technique, for example, for distinguishing between a hand of a driver and a hand of a passenger in a front seat on the basis of an arm approach direction with respect to an operation area of an in-vehicle apparatus (see Patent Document 1).

CITATION LIST

Patent Document

Patent Document 1: Japanese Patent No. 4918872

SUMMARY OF THE INVENTION

Problems to be Solved by the Invention

By the way, in the technique of Patent Document 1, the distinction based on the arm approach direction can be performed by dividing the operation area into two right and left areas since the persons to be identified are two, the driver and the passenger in the front seat.

However, in a case where an operation input is given to an operation area other than that of the in-vehicle apparatus and distinction between two or more persons is necessary, the number of distinguishable persons depends on the number of divisions of the operation area, and further, coping with arm entry from an arbitrary direction is impracticable.

The present disclosure has been made in view of such a situation. In particular, when hand-based operation inputs from a plurality of users are accepted, appropriate pairing of left and right hands is performed for each user.

Solutions to Problems

An information processing apparatus according to one aspect of the present disclosure is an information processing apparatus including an image acquisition unit configured to acquire an image of an operation surface from above, the operation surface being configured to accept a hand-based operation input from users, a hand detector configured to detect left and right hands of the users and arms corresponding to the hands from the image, and a pairing unit configured to perform pairing of the left and right hands detected by the hand detector in the image for each of the users.

An information processing method and a program each according to one aspect of the present disclosure correspond to the information processing apparatus.

According to one aspect of the present disclosure, an image of the operation surface from above is acquired, the operation surface being configured to accept a hand-based operation input from the users, the left and right hands of the users and the arms corresponding to the hands are detected from the image, and the pairing of the detected left and right hands in the image is performed for each of the users.

BRIEF DESCRIPTION OF DRAWINGS

FIG. 9 is a diagram illustrating a reason of employing base positions of arms as the benchmark position and the reference position in the pairing processing, instead of positions of left and right hands.

MODE FOR CARRYING OUT THE INVENTION

Hereinafter, a preferred embodiment of the present disclosure will be described in detail with reference to the accompanying drawings. Note that, in the present specification and the drawings, components having substantially the same functional configuration are denoted by the same reference sign so that repeated description is omitted.

Hereinafter, a mode for carrying out the present technology will be described. The description will be given in the following order.

1. Outline of Present Disclosure
2. Embodiment of Present Disclosure
3. Information Processing by Information Processing System
4. Example of Execution by Software

1. Outline of Present Disclosure

The present disclosure achieves, when hand-based operation inputs from a plurality of users are accepted, appropriate pairing of left and right hands for each user.

First, an outline of the present disclosure will be described.

Figure 1:
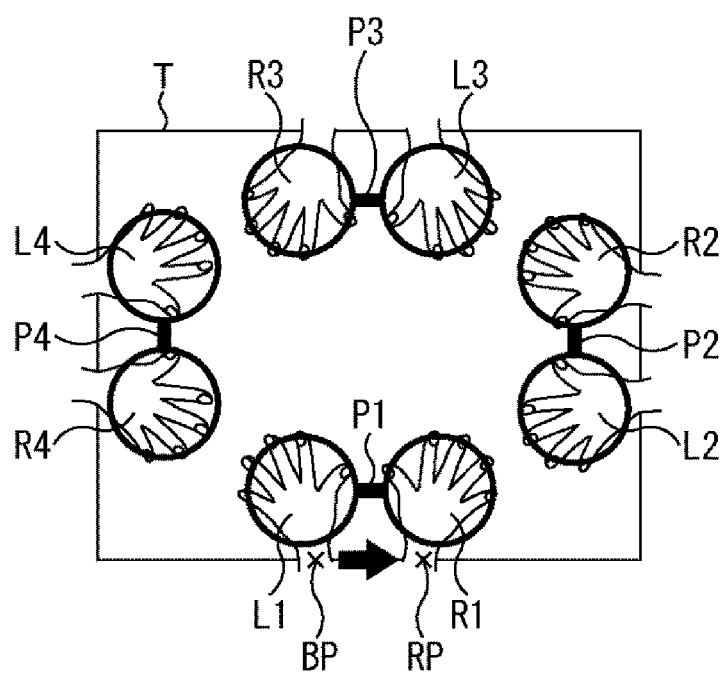
FIG. 1 is a diagram illustrating an outline of the present disclosure.

For example, as shown in FIG. 1, let us assume an information processing system including a table T having a function as a touch panel and a function as a display apparatus, and a camera (not illustrated) that is installed at a position facing the table T and captures an image of the table T from above.

For example, the information processing system of FIG. 1 recognizes, as a gesture, an operation input given by using left and right hands to the table T that is an operation surface on the basis of an image captured by the camera, executes a command corresponding to the operation input recognized as the gesture, and outputs an execution result.

The operation input given by using left and right hands to the table T that is an operation surface is expressed by, for example, a gesture based on a finger touching the table T and belonging to one of the left and right hands and a palm shape of another hand. Here, the palm shape includes shapes that can be formed by a palm, for example, raising a first finger, raising first and second fingers, connecting tips of a first finger and a thumb into a ring, or the like.

Furthermore, the information processing system of FIG. 1 also accepts operation inputs from a plurality of users. In a case where operation inputs from a plurality of users are accepted, the left and right hands are recognized as a pair for each user, and the operation inputs are accepted on the basis of information about the left and right hands set as the pair.

Hence, in order to accept operation inputs from the plurality of users, first, it is necessary to perform appropriate pairing of a plurality of left and right hands for each user.

Here, in the information processing system of the present disclosure, first, the camera captures an image of the table T from above.

Next, a base position of an arm (region) across an edge of the table T is detected on the basis of the image captured by the camera. That is, in a case of FIG. 1, base positions of arms of left hands L1 to L4 and right hands R1 to R4 are detected. Next, after the base positions of the arms are detected, palms are detected in regions each at an end of the arm opposite to the detected base position, and left and right hands are detected according to a thumb orientation and the like.

One of the base positions of the arms across the edge of the table T, corresponding to any one of the left hands among the left and right hands thus detected, is set as a benchmark position. In the case of FIG. 1, for example, the base position of the arm of the left hand L1 is set as a benchmark position BP.

Next, when the arm of the left hand is set as the benchmark position BP, the base position of the arm of the right hand adjacent and closest to the benchmark position BP in a counterclockwise direction along a periphery of the table T is searched for as a reference position RP.

Then, the left hand L1 of the arm having the base positioned at the benchmark position BP and the right hand R1 of the arm having the base positioned at the reference position RP are set as a pair P1.

Next, with respect to the arm having the base positioned at the reference position RP, the base position of the arm of the left hand that is adjacent and closest in the counterclockwise direction is set as a new benchmark position BP.

Hereinafter, in the case of FIG. 1, the base position of the arm of the left hand L2 is set as a second new benchmark position BP.

Then, by a similar method as described above, the base position of the arm of the right hand R2 is set as a reference position RF with respect to the new benchmark position BP, and the right hand R2 of the arm having the base positioned at the new reference position RF and the left hand L2 are set as a pair P2.

Hereinafter, similar processing is repeatedly performed, resulting in setting the left hand L3 and the right hand R3 as a pair P3 and setting the left hand L4 and the right hand R4 as a pair P4.

An example has been described above in which the base position of the arm of the left hand is set as the benchmark position BP, the base position of the arm of the right hand adjacent and closest to the benchmark position BP in the counterclockwise direction along the periphery of the table T is set as the reference position RP, and the left and right hands belonging to the arms having the bases respectively positioned at the benchmark position BP and the reference position RP are set as the pair.

Similarly, the base position of the arm of the right hand may be set as the benchmark position BP. In this case, the base position of the arm of the left hand adjacent and closest to the benchmark position BP in a clockwise direction along the periphery of the table T may be set as the reference position RP, and the right and left hands belonging to the arms at the benchmark position BP and the reference position RP, respectively, may be set as the pair.

The pairing of the left and the right hands of a plurality of users by the above processing allows for appropriate pairing of the left and right hands of a same person.

As a result, it is possible to accept operation inputs from a plurality of users on the basis of gestures made with the left and right hands of which the pairing has been performed.

2. Embodiment of Present Disclosure

<Configuration Example of Information Processing System>

Next, a configuration example of an information processing system according to an embodiment of the present disclosure will be described with reference to the drawings.

Figure 2:
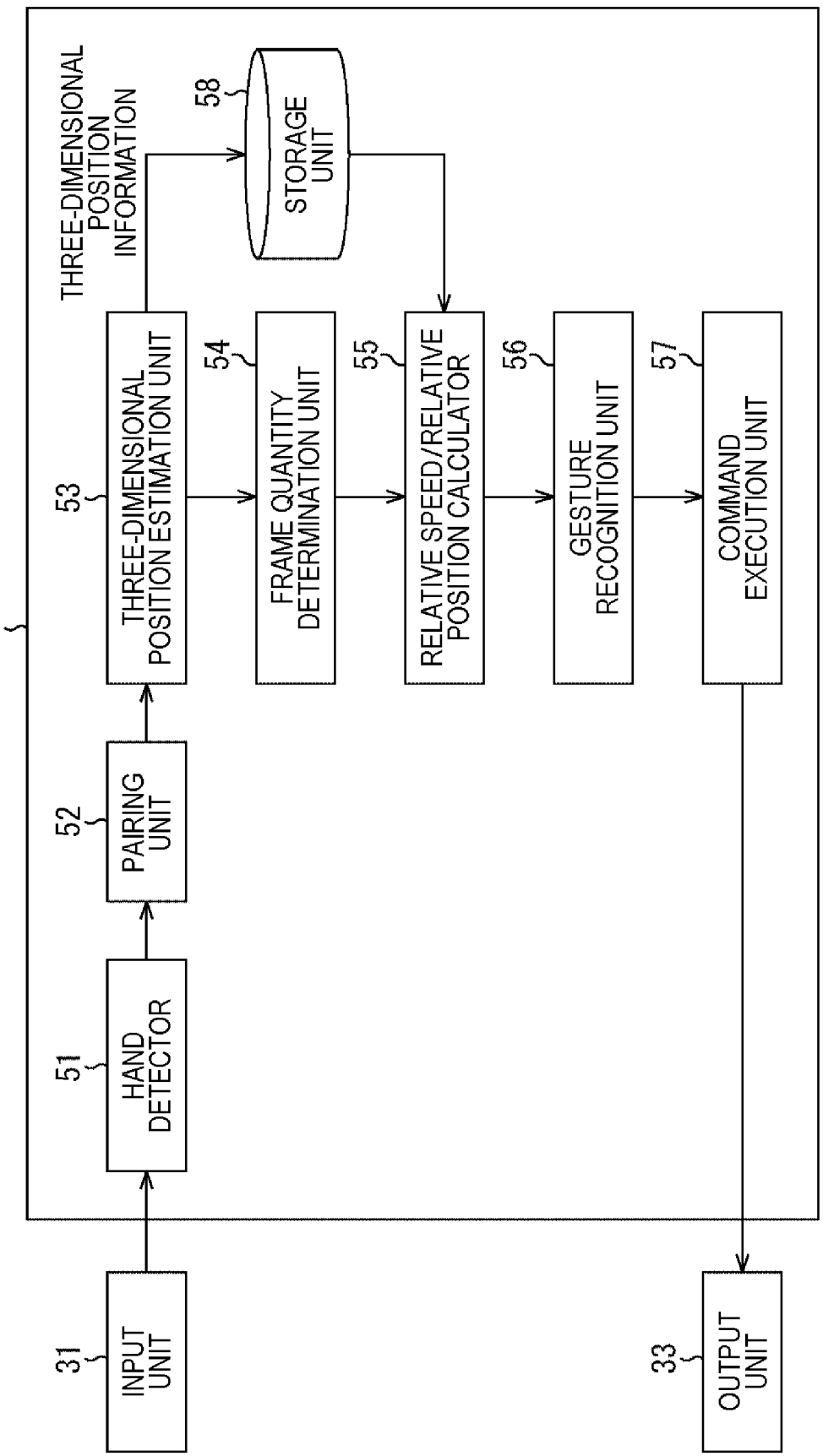
FIG. 2 is a diagram illustrating a configuration example of an information processing system of the present disclosure.

FIG. 2 is a diagram showing a functional configuration example of the information processing system according to the embodiment of the present disclosure.

As shown in FIG. 2, an information processing system 11 includes an input unit 31, an information processing apparatus 32, and an output unit 33.

Furthermore, the information processing apparatus 32 includes a hand detector 51, a pairing unit 52, a three-dimensional position estimation unit 53, a frame quantity determination unit 54, a relative speed/relative position calculator 55, a gesture recognition unit 56, a command execution unit 57, and a storage unit 58.

The input unit 31 includes an input device, and accepts an operation input by sensing an operation body (more specifically, a shape, a movement, and the like of a part or whole of the operation body) with a time axis. The operation body herein includes, for example, a user's hand (a palm) and a corresponding arm.

More specifically, the input unit 31 is constituted by, for example, an image sensor (a camera) and a depth sensor.

However, the input unit 31 does not have to include all of these sensors, and is only required to include at least one of these sensors. Furthermore, the input unit 31 may include a touch sensor. Hereinafter, a case where the image sensor acquires the shape, the movement, and the like of the operation body is mainly assumed. However, which sensor acquires such information is not limited.

That is, the input unit 31 may be constituted by, for example, a first input unit 31 including an image sensor and a second input unit 31 including a touch sensor.

In the present embodiment, let us assume that a gesture is based on changes in the shape and the movement of at least one of the left and right hands and on whether or not a table 71a (FIG. 3) described later is touched and the like, and is accepted as an operation input given by the left and right hands that are the operation body.

Hereinafter, let us mainly assume a case where the shape, the movement, and the like of at least one of the left and right hands that are the operation body are recognized on the basis of an image, and the image is acquired by the image sensor or the depth sensor. However, which sensor acquires such information is not limited. Furthermore, information to be sensed is not limited to an image. Thus, the touch sensor may sense information about whether or not the table 71a is touched and a sensing result thereof may be used.

Note that, as the image sensor, a visible-light camera or an infrared camera may be used. As the depth sensor, a stereo camera, a time of flight (TOF) sensor, or a range image sensor by a structured light method may be used. The touch sensor may be a camera that captures an image from above or below, or a touch panel on a projection surface.

The output unit 33 includes an output device, and outputs information in accordance with a command executed by the command execution unit 57. Hereinafter, let us mainly assume a case where the output unit 33 includes a projector and the projector outputs the information by projecting the information onto the projection surface.

However, the output unit 33 does not always include a projector. For example, the output unit 33 may be a touch panel display and may be a liquid crystal display (LCD), an organic electro-luminescence (EL) display, or the like.

A surface onto which the information is output by the output unit 33 corresponds to a display surface (the projection surface). In particular, in a case where the projector is used as the output device, the display surface corresponds to the projection surface (for example, a top surface of the table) onto which the information is projected by the projector. In the following description, a case where the projection surface is used as the display surface is mainly assumed, but the display surface is not limited to the projection surface. Furthermore, an area within which the information is projected by the projector is not always on the table surface. For example, the area within which the information is projected by the projector may be on a floor surface, a wall surface, an object, or the like.

The information processing apparatus 32 performs processing on the basis of a sensing result input from the input unit 31, and outputs a processing result to the output unit 33.

More specifically, the information processing apparatus 32 is constituted by, for example, a personal computer or the like including a processor, a memory, and the like, and is physically connected to the input unit 31 and the output unit 33.

Furthermore, the information processing apparatus 32 may be realized by, for example, a server configured on a network or cloud computing, and may be connected to the input unit 31 and the output unit 33 via the network.

Note that the information processing apparatus 32 will be described later in detail.

<Exterior Configuration Example of Information Processing System>

Figure 3:
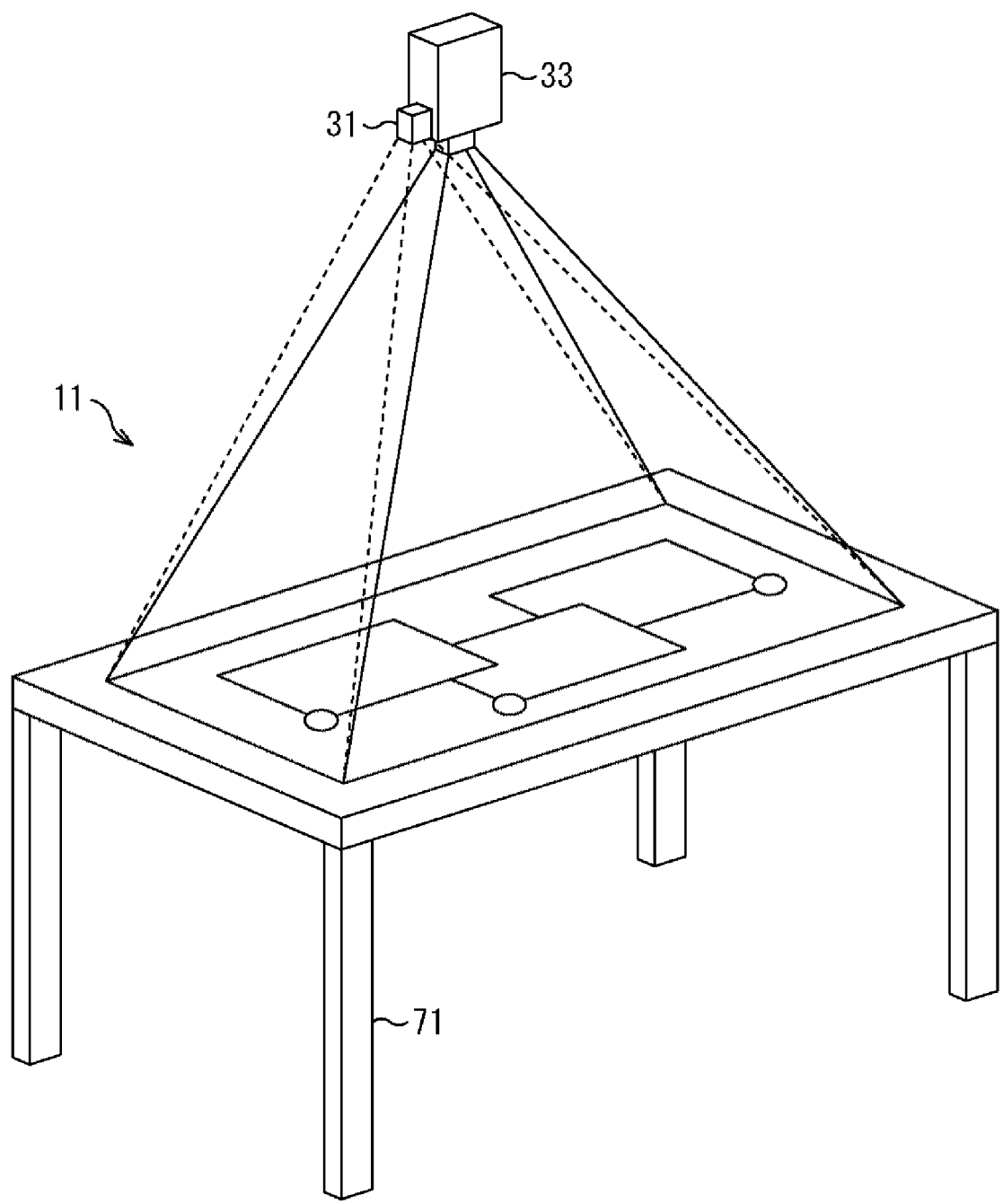
FIG. 3 is a diagram showing an exterior configuration example of the information processing system in FIG. 2.

FIG. 3 is a diagram showing an exterior configuration example of the information processing system 11 according to the embodiment of the present disclosure. As shown in FIG. 3, the information processing system 11 includes the input unit 31 and the output unit 33. The information processing system 11 displays information on the top surface of the table 71, and prompts the user to perform an operation in reaction to the information displayed on the table 71. Such a method of displaying information on the top surface of the table 71 is also referred to as "a projection type".

The input unit 31 accepts, as input information, the operation by the user, a shape and a pattern of an object placed on the table 71, and the like. In the example shown in FIG. 3, the input unit 31 is provided above the table 71 in a state of being suspended from a ceiling. Such a method of emitting information from above the table 71 by the output unit 33 and displaying the information on the top surface of the table 71 is also referred to as "an upper projection type". As the input unit 31, there may be used a camera that captures an image of the table 71 with one lens, a stereo camera that can capture an image of the table 71 with two lenses to record the information in a depth direction, or a microphone for collecting sounds emitted by the users and ambient sounds.

In a case where the camera that captures an image of the table 71 with one lens is used as the input unit 31, the information processing system 11 can recognize an object placed on the table 71 and a gesture made with a user's hand by analyzing the image captured by the camera. Alternatively, in a case where the stereo camera is used as the input unit 31, the information processing system 11 can recognize an object (such as a hand) placed on the table 71 and a gesture on the basis of depth information acquired by the stereo camera. Additionally, the information processing system 11 can recognize contact between the user's hand and the table 71 and separation of the hand from the table 71 on the basis of the depth information.

Alternatively, in a case where the microphone is used as the input unit 31, a microphone array for collecting sounds in a specific direction may be used as the microphone. In a case where the microphone array is used as the input unit 31, the information processing system 11 may adjust a sound collection direction of the microphone array to an arbitrary direction.

The output unit 33 displays the information on the table 71 and outputs a sound in response to the input information. As the output unit 33, a projector, a speaker, or the like may be used. In the example shown in FIG. 3, the output unit 33 is provided above the table 71 in the state of being suspended from the ceiling. In a case where the output unit 33 is constituted by the projector, the output unit 33 projects the information onto the top surface of the table 71. In a case where the output unit 33 is constituted by the speaker, the output unit 33 outputs a sound on the basis of a sound signal. At this time, the number of the speakers may be one or more. In a case where the output unit 33 is constituted by a plurality of the speakers, the information processing system 11 may limit the speaker that outputs a sound or may adjust a sound output direction.

Furthermore, in a case where the information processing system 11 according to the embodiment of the present disclosure is the projection type as shown in FIG. 3, the output unit 33 may include lighting equipment. In a case where the output unit 33 includes the lighting equipment, the information processing system 11 may control a state of the lighting equipment, such as on and off, on the basis of content of the input information accepted by the input unit 31. Furthermore, in a case where the information processing system 11 according to the embodiment of the present disclosure is the upper projection type as shown in FIG. 3, the information can be displayed not only on the table 71 but also on an object placed on the table 71.

The user can give various operation inputs by a gesture made with a palm, fingers, and the like in reaction to the information displayed on the table 71 by the output unit 33. Furthermore, the user can cause the input unit 31 to recognize an object that has been placed on the table 71 by the user, thereby causing the information processing system 11 to execute various types of processing related to the object.

Let us return to FIG. 2 to continue the description. Next, a configuration example of the information processing apparatus 32 will be described. The information processing apparatus 32 includes the hand detector 51, the pairing unit 52, the three-dimensional position estimation unit 53, the frame quantity determination unit 54, the relative speed/relative position calculator 55, the gesture recognition unit 56, and the command execution unit 57. These blocks are configured by, for example, one or more processing units such as a central processing unit (CPU). In a case where these blocks are configured by the processing units such as a CPU, the processing unit may be constituted by an electronic circuit. Alternatively, each block may be realized by a server configured on a network or by cloud computing.

The hand detector 51 recognizes an arm on the basis of the input information acquired by the input unit 31, recognizes and detects a base position of the recognized arm and a position of a hand (a palm and a wrist) continuous with the arm as an operation body, and outputs a detection result to the pairing unit 52 together with the input information. Note that the base position of the arm herein is, for example, a position of an intersection of the arm and the peripheral portion of the table 71 in the captured image.

The pairing unit 52 performs pairing of the right and left hands of a same user on the basis of the input information and the hand detection result.

The pairing unit 52 performs the pairing of the right and left hands of a same user on the basis of the input information and the hand detection result, by using the information about the left and right hands and the base positions of the arms appertaining to the hands.

<Pairing Method for Left and Right Hands (Part 1)>

Figure 4:
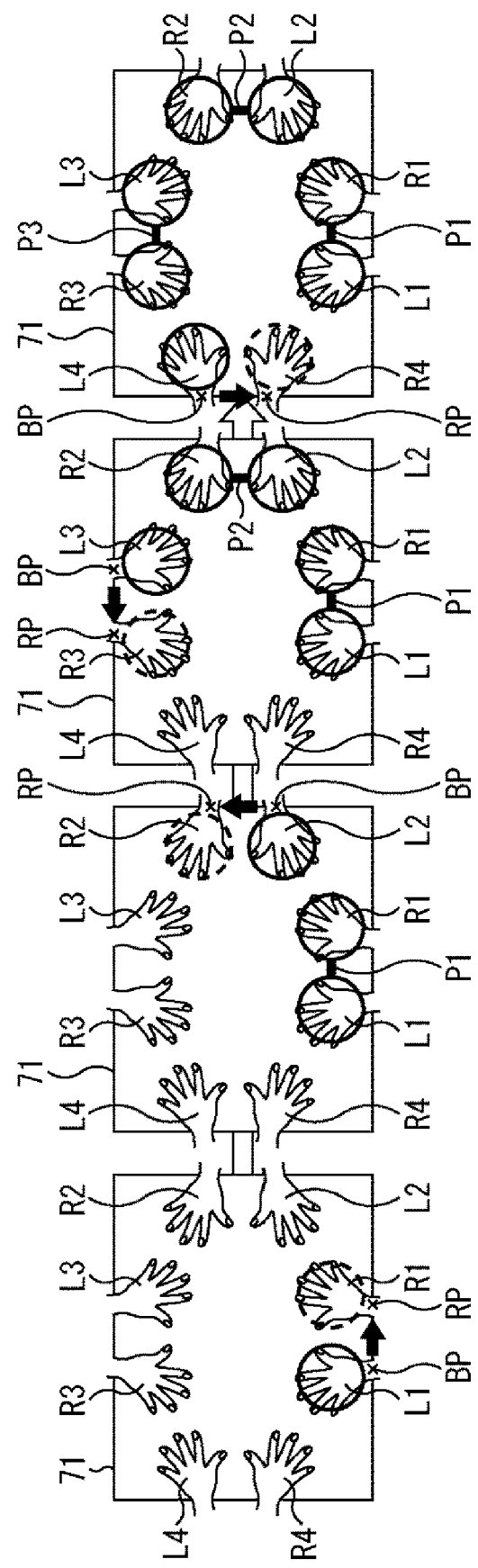
FIG. 4 is a diagram illustrating counterclockwise pairing processing.

More specifically, let us consider a case of using, as the input information, an image in which there are left hands L1 to L4 and right hands R1 to R4 on the top surface of the table 71 as shown in the leftmost part of FIG. 4, for example.

Note that, in the leftmost part of FIG. 4, the left hand L1 and the right hand R1 belong to a first same user, the left hand L2 and the right hand R2 belong to a second same user, the left hand L3 and the right hand R3 belong to a third same user, and the left hand L4 and the right hand R4 belong to a fourth same user.

Accordingly, the pairing unit 52 is required to perform the pairing of the left hand L1 and the right hand R1, the pairing of the left hand L2 and the right hand R2, the pairing of the left hand L3 and the right hand R3, and the pairing of the left hand L4 and the right hand R4 individually as a pair of left and right hands of a same person.

Thus, the pairing unit 52 sets any one of the base positions of the arms continuous with the wrists of the left hands L1 to L4 or the right hands R1 to R4 as the benchmark position BP. Here, for example, as shown in the leftmost part of FIG. 4, the base position of the arm of the left hand L1 is assumed to be set as the benchmark position BP.

Next, when the base position of the arm of the left hand is set as the benchmark position BP, the pairing unit 52 searches for the base of the arm that is closest adjacent to the benchmark position BP in the counterclockwise direction along the peripheral portion of the table 71, and sets the position of the searched-out base of the arm as the reference position RP.

Then, the pairing unit 52 sets the hands continuous with the bases of the respective arms at the benchmark position BP and the reference position RP as a pair.

That is, as shown in the leftmost part of FIG. 4, the left hand L1 of the arm of which the base position is set as the benchmark position BP and the right hand R1 of the arm of which the base position is set as the reference position RP are set as the pair P1. By the above processing, the left hand L1 and the right hand R1 are taken as left and right hands of a same person and set as the pair P1.

Next, the pairing unit 52 searches for the base of the arm that is closest to the reference position RP in the counterclockwise direction along the periphery of the table 71, and sets the position of the searched-out base of the arm as a new benchmark position BP.

That is, as shown in the second part from the left of FIG. 4, the base position of the arm of the left hand L2 is closest to the reference position RP in the counterclockwise direction along the periphery of the table 71 from the position of the arm of the right hand R1 set as the reference position RP, and is thus set as the new benchmark position BP.

Next, when the base position of the arm of the left hand L2 is set as the benchmark position BP, the pairing unit 52 searches for the base of the arm of the right hand R2 as the base of the arm that is closest adjacent to the benchmark position BP in the counterclockwise direction along the periphery of the table 71, and sets the position of the searched-out base of the arm of the right hand R2 as a reference position RP.

Then, as shown in the second part from the left of FIG. 4, the left hand L2 of the arm of which the base position is set as the benchmark position BP and the right hand R2 of the arm of which the base position is set as the reference position RP are set as the pair P2.

Thereafter, similar processing is repeatedly performed, resulting in setting the base position of the arm of the left hand L3 as a new benchmark position BP and setting the base position of the arm of the right hand R3 as a corresponding reference position RP, as shown in the second part from the right of FIG. 4. As a result, the left hand L3 and the right hand R3 are set as the pair P3.

Then, as shown in the rightmost part of FIG. 4, the base position of the arm of the left hand L4 is set as a new benchmark position BP, and the base position of the arm of the right hand R4 is set as a corresponding reference position RP. As a result, the left hand L4 and the right hand R4 are set as the pair P4.

That is, as shown in FIG. 4, the left hand L1 and the right hand R1, the left hand L2 and the right hand R2, the left hand L3 and the right hand R3, and the left hand L4 and the right hand R4 are set as the pair P1, the pair P2, the pair P3, and the pair P4, respectively. Note that the pairing processing described with reference to FIG. 4 is hereinafter also referred to as counterclockwise pairing processing.

<Pairing Method for Left and Right Hands (Part 2)>

Note that an example has been described above in which the base position of the arm of the left hand is set as the benchmark position BP and the base position of the arm of the right hand closest to the benchmark position BP in the counterclockwise direction along the periphery of the table 71 is set as the reference position RP. However, it is possible to set the base position of the arm of the right hand as the benchmark position BP and set the base position of the arm of the left hand closest adjacent to the benchmark position BP in the clockwise direction along the periphery of the table 71 as the reference position RP.

Figure 5:
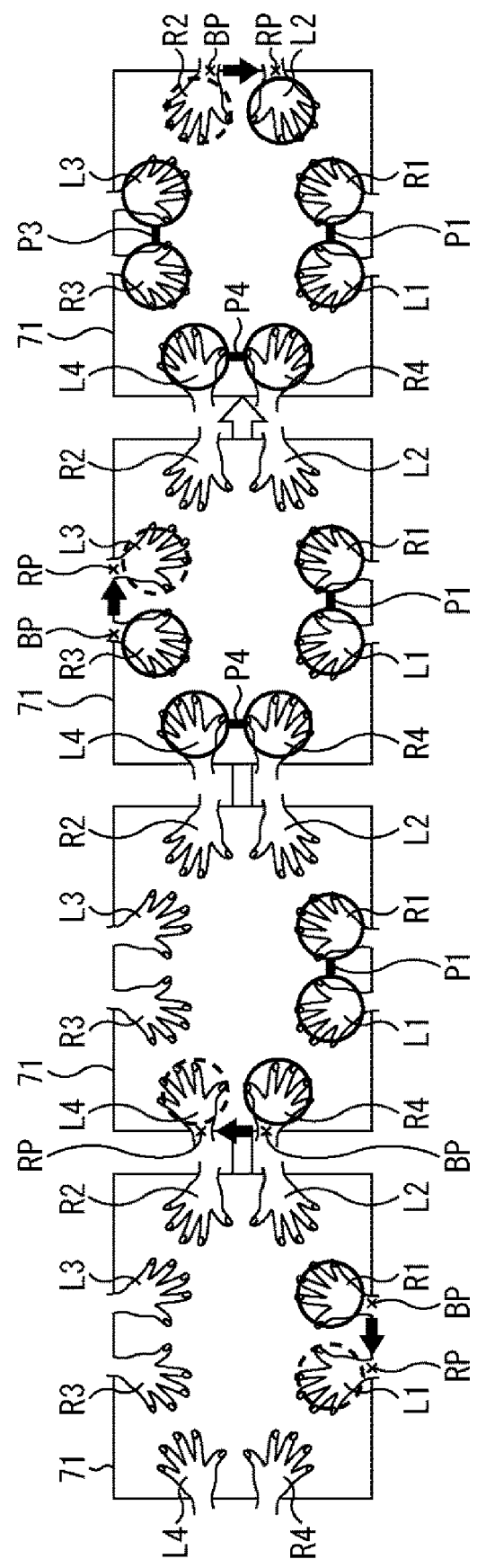
FIG. 5 is a diagram illustrating clockwise pairing processing.

That is, for example, the base position of the arm of the right hand R1 in the leftmost part of FIG. 5 is assumed to be set as the benchmark position BP.

Next, when the base position of the arm of the right hand is set as the benchmark position BP, the pairing unit 52 searches for the base of the arm of the hand that is closest adjacent to the benchmark position BP in the clockwise direction along the periphery of the table 71, and sets the position of the wrist of the searched-out left hand as the reference position RP.

Then, the pairing unit 52 sets the hands continuous with the respective arms at the benchmark position BP and the reference position RP as a pair.

That is, as shown in the leftmost part of FIG. 5, the right hand R1 of the arm of which the base position is set as the benchmark position BP and the left hand R1 of the arm of which the base position is set as the reference position RP are set as the pair P1. That is, by the above processing, the left hand L1 and the right hand R1 are taken as left and right hands of a same person and set as the pair P1.

Next, the pairing unit 52 searches for the base of the arm that is closest adjacent to the reference position RP in the clockwise direction along the periphery of the table 71, and sets the position of the searched-out base of the arm as a new benchmark position BP.

That is, as shown in the second part from the left of FIG. 5, the base position of the arm of the right hand R4 is closest adjacent to the reference position RP in the clockwise direction along the periphery of the table 71 from the base position of the arm of the left hand L1 set as the reference position RP, and is thus set as the new benchmark position BP.

Next, when the base position of the arm of the right hand R4 is set as the benchmark position BP, the pairing unit 52 searches for the base of the arm of the left hand L4 as the base of the arm that is closest adjacent to the benchmark position BP in the clockwise direction along the periphery of the table 71, and sets the position of the searched-out base of the arm of the left hand L4 as a reference position RP.

Then, as shown in the second part from the left of FIG. 5, the right hand R4 of the arm of which the base position is set as the benchmark position BP and the left hand L4 of the arm of which the base position is set as the reference position RP are set as the pair P4.

Thereafter, similar processing is repeatedly performed, resulting in setting the base position of the arm of the right hand R3 as a new benchmark position BP and setting the base position of the arm of the left hand L3 as a corresponding reference position RP, as shown in the second part from the right of FIG. 5. As a result, the left hand L3 and the right hand R3 are set as the pair P3.

Then, as shown in the rightmost part of FIG. 5, the base position of the arm of the right hand R2 is set as a new benchmark position BP, and the base position of the arm of the left hand L2 is set as a corresponding reference position RP. As a result, the left hand L2 and the right hand R2 are set as the pair P2.

That is, similarly to FIG. 4, as shown in FIG. 5, the left hand L1 and the right hand R1, the left hand L2 and the right hand R2, the left hand L3 and the right hand R3, and the left hand L4 and the right hand R4 are set as the pair P1, the pair P2, the pair P3, and the pair P4, respectively. Note that the pairing processing described with reference to FIG. 5 is hereinafter also referred to as clockwise pairing processing.

<Case of Detection of Only Left or Right Hand (Part 1)>

An exemplary state has been described above in which the left and right hands of each user are placed on the top surface of the table 71 that is the operation surface. However, a state in which only one of the hands is placed on the top surface of the table 71 is also assumed. In such a case, the one of the left and right hands placed on the top surface of the table 71 is counted as a pair.

Figure 6:
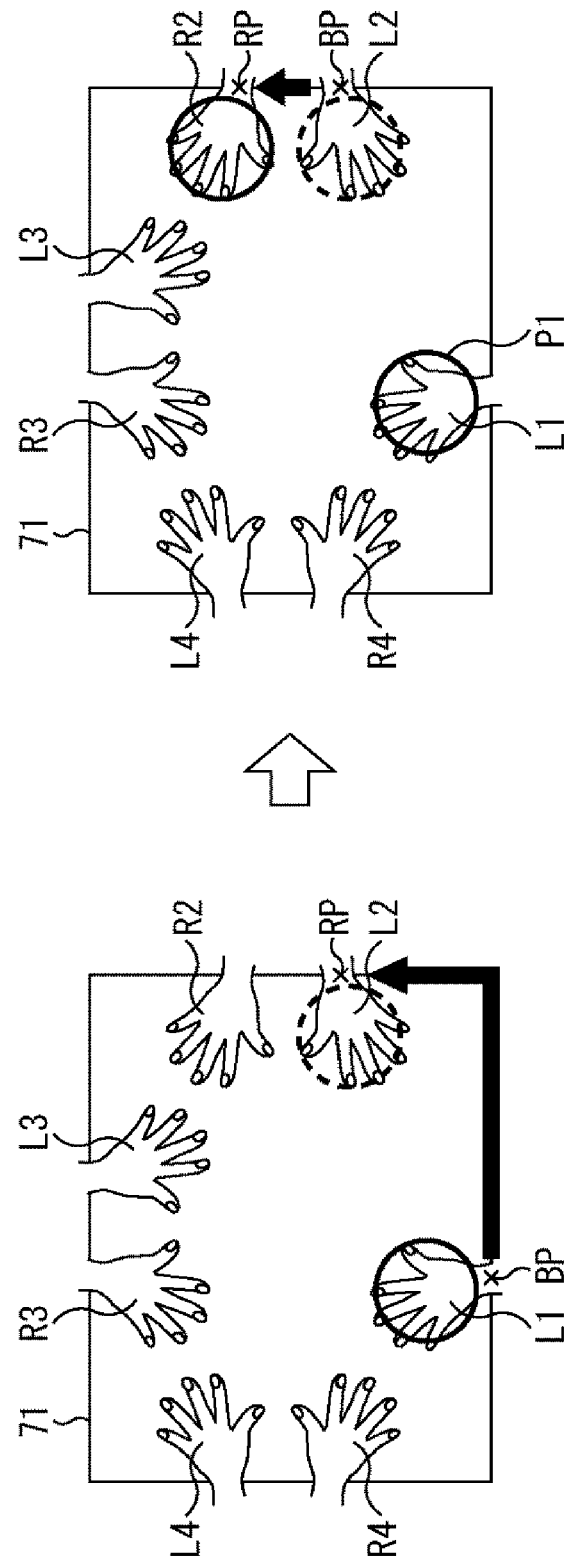
FIG. 6 is a diagram illustrating the counterclockwise pairing processing in a case where hands corresponding to a benchmark position and a reference position are both left hands or right hands.

That is, in a case where the base position of the arm of the left hand is set as the benchmark position BP, as shown in the left part of FIG. 6, when only the left hand L1 is placed on the top surface of the table 71 and the right hand R1 is not placed there, the position of the arm of the left hand L1 is set as the benchmark position BP.

Here, the counterclockwise pairing processing described with reference to FIG. 4 is performed. Since not the right hand R1 of the user with the left hand L1 but the left hand L2 of another user is positioned closest adjacent to the benchmark position BP in the counterclockwise direction, no pair can be formed.

In such a case, it is considered that no right hand in the vicinity is paired with the left hand L1 of the arm of which the base position is set as the benchmark position BP. Then, the pair P1 is formed in association with only the left hand L1.

That is, in this case, it is considered that the user with the left hand L1 places only the left hand L1 on the top surface of the table 71 and does not place the right hand on the top surface of the table 71.

Then, as shown in the right part of FIG. 6, the position of the searched-out arm of the left hand L2 is set as the new benchmark position BP.

Hereinafter, by processing similar to the counterclockwise pairing processing described above, the position of the arm of the right hand R2 that is closest to the benchmark position BP in the counterclockwise direction along the periphery of the table 71 is set as the reference position RP, and the left hand L2 and the right hand R2 are set as the pair P2.

<Case of Detection of Only Left or Right Hand (Part 2)>

Figure 7:
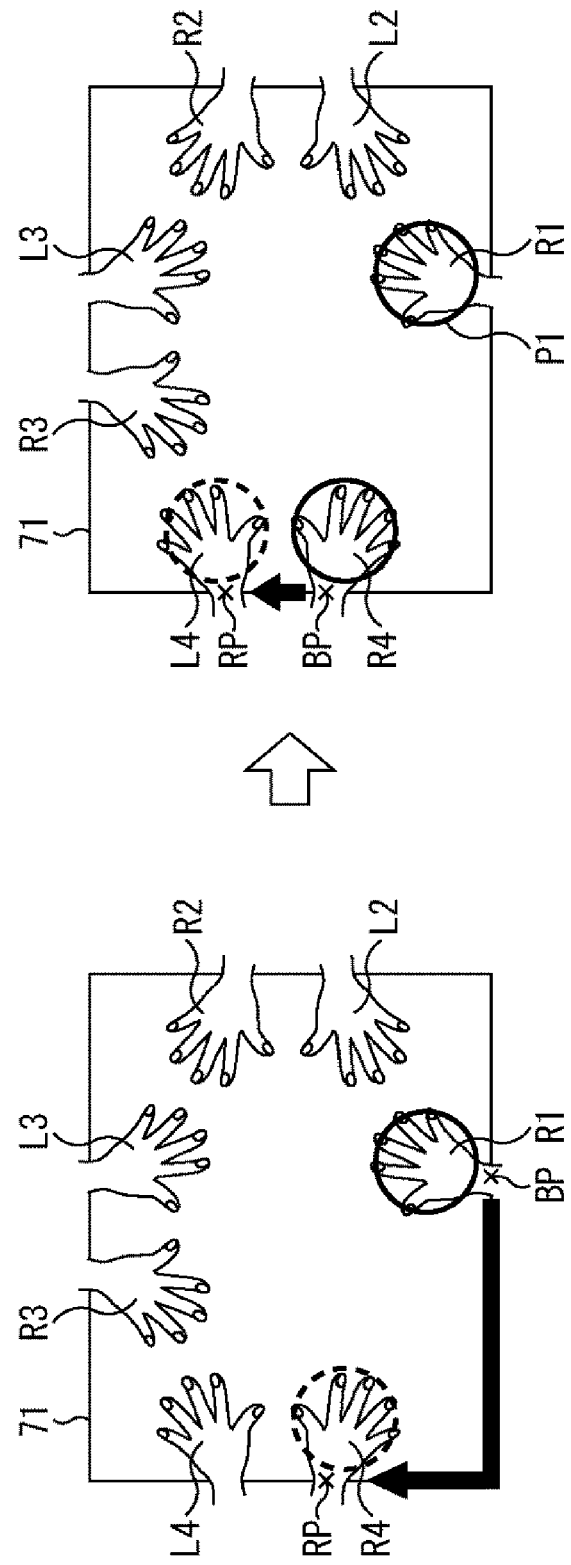
FIG. 7 is a diagram illustrating the clockwise pairing processing in a case where the hands corresponding to the benchmark position and the reference position are both left hands or right hands.

Alternatively, in a case where the base position of the arm of the right hand is set as the benchmark position BP, as shown in the left part of FIG. 7, when only the right hand R1 is placed on the top surface of the table 71 and the left hand L1 is not placed there, the position of the arm of the right hand R1 is set as the benchmark position BP.

Here, the clockwise pairing processing is performed. Since not the left hand L1 of the user with the right hand R1 but the right hand R4 of another user is positioned closest to the benchmark position BP in the clockwise direction along the periphery of the table 71, no pair can be formed.

In such a case, it is considered that no left hand in the vicinity is paired with the right hand R1 of the arm at the benchmark position BP. Then, the pair P1 is formed in association with only the right hand R1.

That is, in this case, it is considered that the user with the right hand R1 places only the right hand R1 on the top surface of the table 71 and does not place the left hand on the top surface of the table 71.

Then, as shown in the right part of FIG. 7, the position of the searched-out arm of the right hand R4 is set as the new benchmark position BP.

Hereinafter, by processing similar to the clockwise pairing processing described above, the position of the arm of the left hand L4 that is closest to the benchmark position BP in the clockwise direction along the periphery of the table 71 is set as the reference position RP, and the left hand L4 and the right hand R4 are set as the pair P4.

<Case of Detection of Left and Right Hands Separated by More than Predetermined Distance>

An exemplary state has been described above in which the user places only one of the left and right hands on the top surface of the table 71. However, even when the left and right hands are detected correspondingly to the benchmark position BP and the reference position RP closest thereto in the counterclockwise direction or the clockwise direction, the hands may be counted as respective different-users' hands if a distance therebetween is longer than a predetermined distance.

Figure 8:
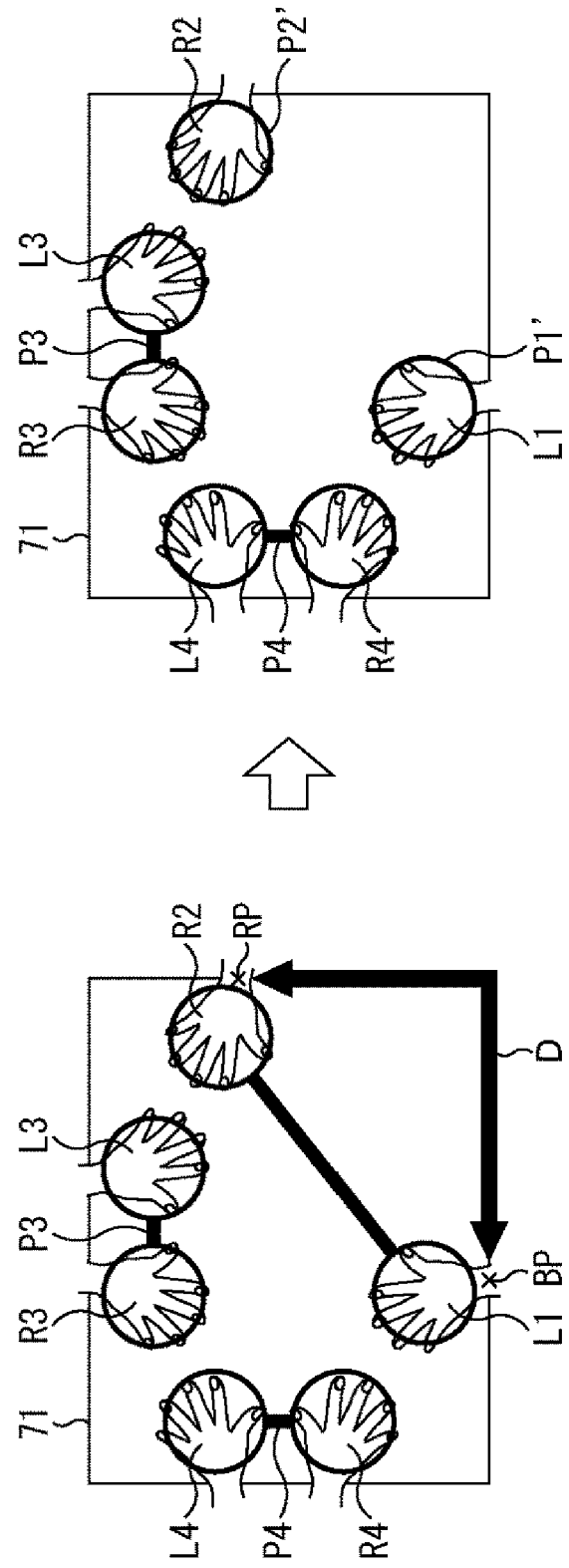
FIG. 8 is a diagram illustrating pairing processing when a distance between the benchmark position and the reference position is longer than a predetermined distance.

For example, let us assume that, in a case of the counterclockwise pairing processing, as shown in the left part of FIG. 8, the base position of the arm of the left hand L1 is set as the benchmark position BP and the base position of the arm of the right hand R2 that is closest to the benchmark position BP in the counterclockwise direction along the periphery of the table 71 is detected as the reference position RP.

At this time, if a distance D between the benchmark position BP and the reference position RP is longer than the predetermined distance (for example, a distance along arms when a human is assumed to spread out the arms to the left and right), even the hands that are a pair of left and right hands are not able to be counted as a pair of a same person.

Thus, in such a case, it is considered that the user with the left hand L1 corresponding to the benchmark position BP places only the left hand L1 on the top surface of the table 71, and the user with the right hand R2 corresponding to the reference position RP is different from the user with the left hand L1 and places only the right hand R1 on the top surface of the table 71.

That is, in such a case, as shown in the right part of FIG. 8, only the left hand L1 is counted as a pair P1', and only the right hand R1 is counted as a pair P2'.

Note that an example of the counterclockwise pairing processing in which the base of the arm of the left hand is set as the benchmark position BP is described here. However, the clockwise pairing processing in which the base of the arm of the right hand is set as the benchmark position would be similarly described.

<Reason of Employing Base Positions of Arms as Benchmark Position and Reference Position>

In the above description, the base positions of the arms are employed as the benchmark position and the reference position for identifying the positions of the left and right hands.

For example, in a case where (respective palms of) left and right hands are placed on the top surface of the table 71, as shown in the left part of FIG. 9, when the left hand L1 at a tip of an arm HL is positioned on a left side in the figure and the right hand R1 at a tip of an arm HR is positioned on a right side in the figure, the positions of the left and right hands can be confirmed simply by the positions of the left hand L1 and the right hand R1.

However, as shown in the right part of FIG. 9, when the left hand L1 is positioned on a right side on the table 71 in the figure and the right hand R1 is positioned on a left side on the table 71 in the figure with the arms crossed, setting the positions of the left hand L1 and the right hand R1 as benchmarks in the above sequential processing would result in failure in appropriate pairing.

However, as for the arms HL and HR, a positional relationship between the bases of the left and right arms remains unchanged even when the arms are crossed. Also in image recognition, positional relationships between the arm HL and the left hand L1 and between the arm HR and the right hand R1 can be recognized.

Thus, in the present disclosure, the benchmark position BP and the reference position RF are set on the basis of the base positions of the arms HR and HL, resulting in appropriate pairing of the left hand L1 and the right hand R1.

An example has been described above in which the pairing is performed by setting the benchmark position and the reference position on the basis of the base positions of the arms detected in each image. However, a gesture made with the right and left hands set as the pair may be recognized by tracking the positions of the right and left hands of which the pairing has been once performed as well as the base positions of the respective arms thereof in the images that have been successively captured.

Here, let us return to the description of the information processing apparatus 32 of FIG. 2.

The three-dimensional position estimation unit 53 estimates three-dimensional positions of points on a user's body as exemplary points on the operation body on the basis of the input information acquired by the input unit 31. The points on the user's body include points on the user's hand (for example, predetermined points on the fingers, a predetermined point on the palm, and the like), a predetermined point on a user's wrist (for example, a wrist position), a predetermined point on a user's elbow (for example, an elbow joint position), and the like. Hereinafter, as exemplary points on the user's body estimated by the three-dimensional position estimation unit 53, the points on the user's hand, the wrist position, and the elbow joint position will be described. However, the points on the user's body may also include a predetermined point on a shoulder (for example, a shoulder joint position) and the like.

<Exemplary Points on Body>

Figure 10:
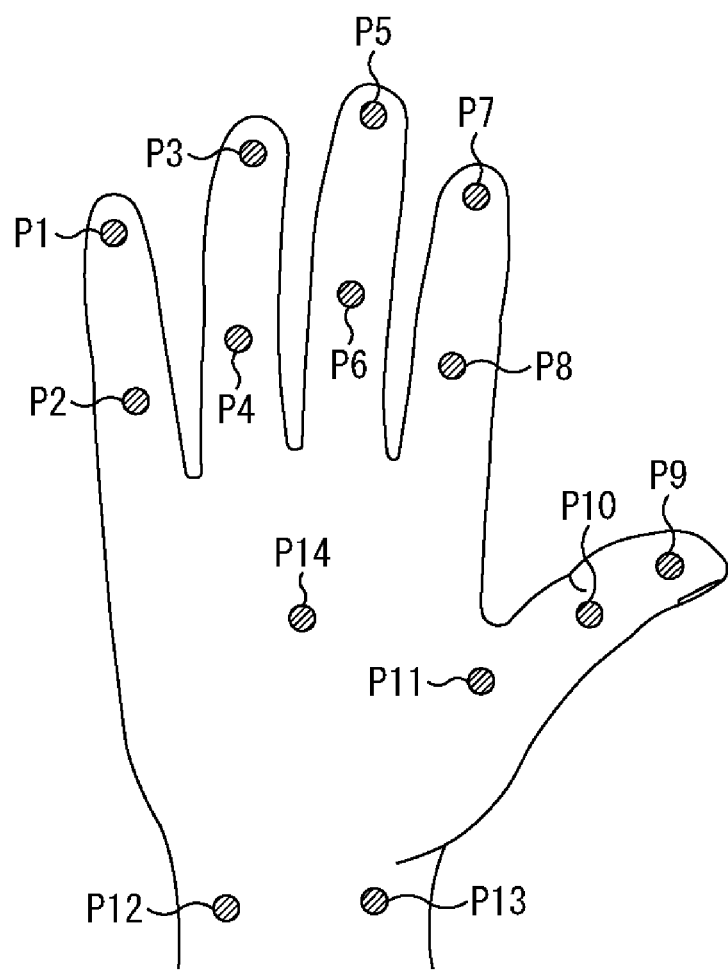
FIG. 10 is a diagram showing exemplary points on a user's body of which three-dimensional positions are estimated by a three-dimensional position estimation unit.
Figure 11:
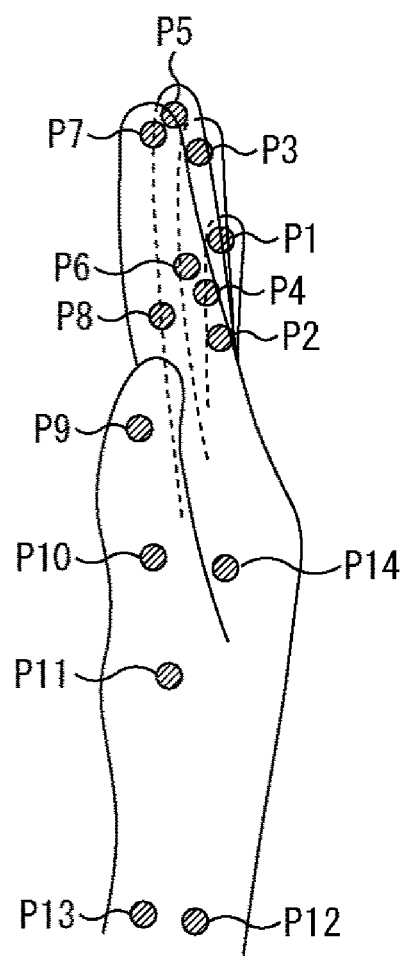
FIG. 11 is a diagram showing the exemplary points on the user's body of which three-dimensional positions are estimated by the three-dimensional position estimation unit.
Figure 12:
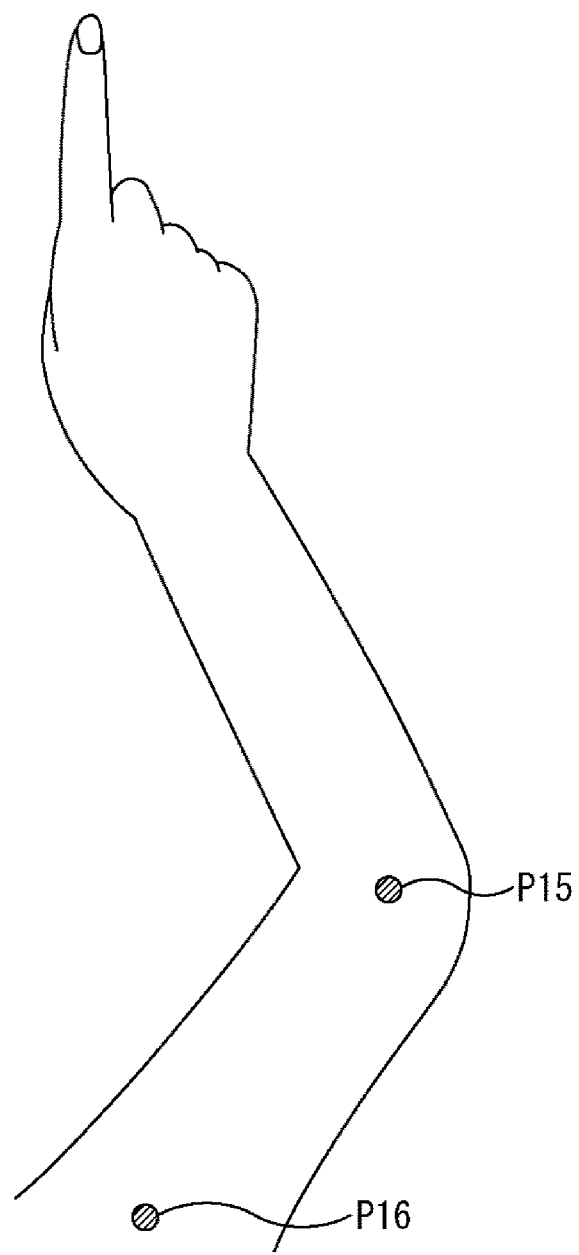
FIG. 12 is a diagram showing exemplary points on the user's body of which three-dimensional positions are estimated by the three-dimensional position estimation unit.

FIGS. 10 to 12 are diagrams showing the exemplary points on the user's body of which three-dimensional positions are estimated by the three-dimensional position estimation unit 53.

Referring to FIGS. 10 to 12, as the exemplary points on the user's body, there are shown a fourth-finger tip position P1, a fourth-finger joint position P2, a third-finger tip position P3, a third-finger joint position P4, a second-finger tip position P5, a second-finger joint position P6, a first-finger tip position P7, a first-finger joint position P8, a thumb tip position P9, a thumb first-from-tip joint position P10, a thumb second-from-tip joint position P11, a wrist position (fourth-finger side) P12, a wrist position (thumb side) P13, a hand center position P14, an elbow joint position P15, and an upper-arm base position P16.

In the embodiment of the present disclosure, let us mainly assume a case where the three-dimensional position estimation unit 53 acquires all the positions P1 to P16 in principle.

However, the three-dimensional position estimation unit 53 may acquire only some of the positions P1 to P16.

Furthermore, a case where some of the positions P1 to P16 fail to be acquired due to a positional relationship between the input unit 31 and the user or the like is also assumed. For example, the upper-arm base position P16 may not be directly acquired. Even in such a case, any position acquired between the elbow joint position P15 and the upper-arm base position P16 would be able to be used instead of the upper-arm base position P16.

Note that the hand center position P14 is not particularly limited as long as it is a predetermined position among a thumb base, respective four finger bases, and the wrist (that is, in the palm). For example, the hand center position P14 may be a barycentric position of a plurality of the points. Furthermore, it is sufficient that the wrist position (fourth-finger side) P12 and the wrist position (thumb side) P13 are respectively a position closer to the thumb and a position closer to the fourth finger among two positions obtained as the wrist positions. Each of the wrist position (fourth-finger side) P12 and the wrist position (thumb side) P13 may also be appropriately changed depending on an algorithm for detecting the respective positions or the like.

Figure 13:
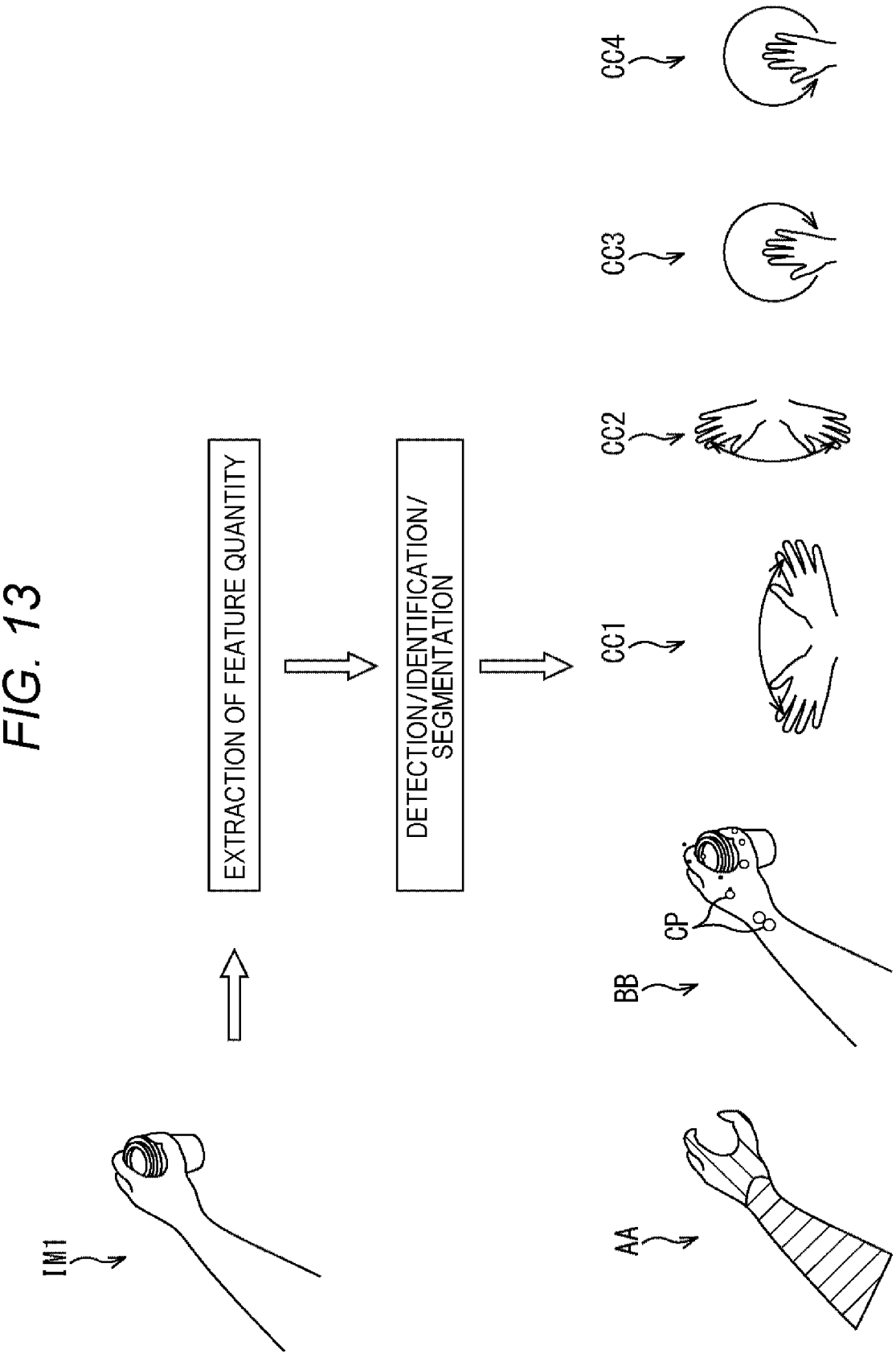
FIG. 13 is a diagram for explaining an outline of a three-dimensional position estimation method.

Next, a three-dimensional position estimation method performed by the three-dimensional position estimation unit 53 will be described. FIG. 13 is a diagram for explaining an outline of the three-dimensional position estimation method. Herein, a case where the three-dimensional positions of the points on the hand are estimated will be mainly described.

However, as described above, the three-dimensional positions of the points other than those on the hand can also be estimated. For example, let us assume a case where the input unit 31 has acquired an image (an image IM1) in which a coffee cup is held with a hand. At this time, the three-dimensional position estimation unit 53 calculates feature quantities on the basis of the image IM1. Examples of the feature quantity include a feature quantity based on a convolutional neural network (CNN), the histograms of oriented gradients (HOG) feature quantity, and a feature quantity based on the scale invariant feature transform (SIFT).

Then, the three-dimensional position estimation unit 53 estimates the three-dimensional positions of the points on the user's hand by applying analysis that uses a predetermined algorithm, such as detection, identification, and segmentation, to the obtained feature quantities. As the algorithm, the above-described CNN, boosting, a support vector machine (SVM), graph cuts, and the like are applicable.

Then, the three-dimensional position estimation unit 53 can detect the three-dimensional positions of the points on the user's hand as indicated by reference sign AA in FIG. 13 according to an analysis result. Additionally, the three-dimensional position estimation unit 53 can detect a position and posture of the hand as indicated by reference sign BB in FIG. 13. Note that, in an illustration indicated by reference sign BB, circles on the hand represent feature points CP.

Furthermore, the three-dimensional position estimation unit 53 can also recognize movements of the hand as indicated by reference signs CC (CC1 to CC4) in FIG. 13 by performing the above-described processing on a plurality of image frames. The hand movement denoted by reference sign CC1 represents an example (horizontal) where the hand moves in a horizontal direction. The hand movement denoted by reference sign CC2 represents an example (vertical) where the hand moves in a vertical direction. The hand movement denoted by reference sign CC3 represents an example (clockwise) where the hand moves in a clockwise direction. The hand movement denoted by reference sign CC4 represents an example (counterclockwise) where the hand moves in a counterclockwise direction. Of course, the hand movements to be recognized are not limited to the illustrated ones, and various hand movements can be recognized. Note that the above-described processing is not always based on the exemplified algorithms, and a publicly known method can also be applied thereto.

Figure 14:
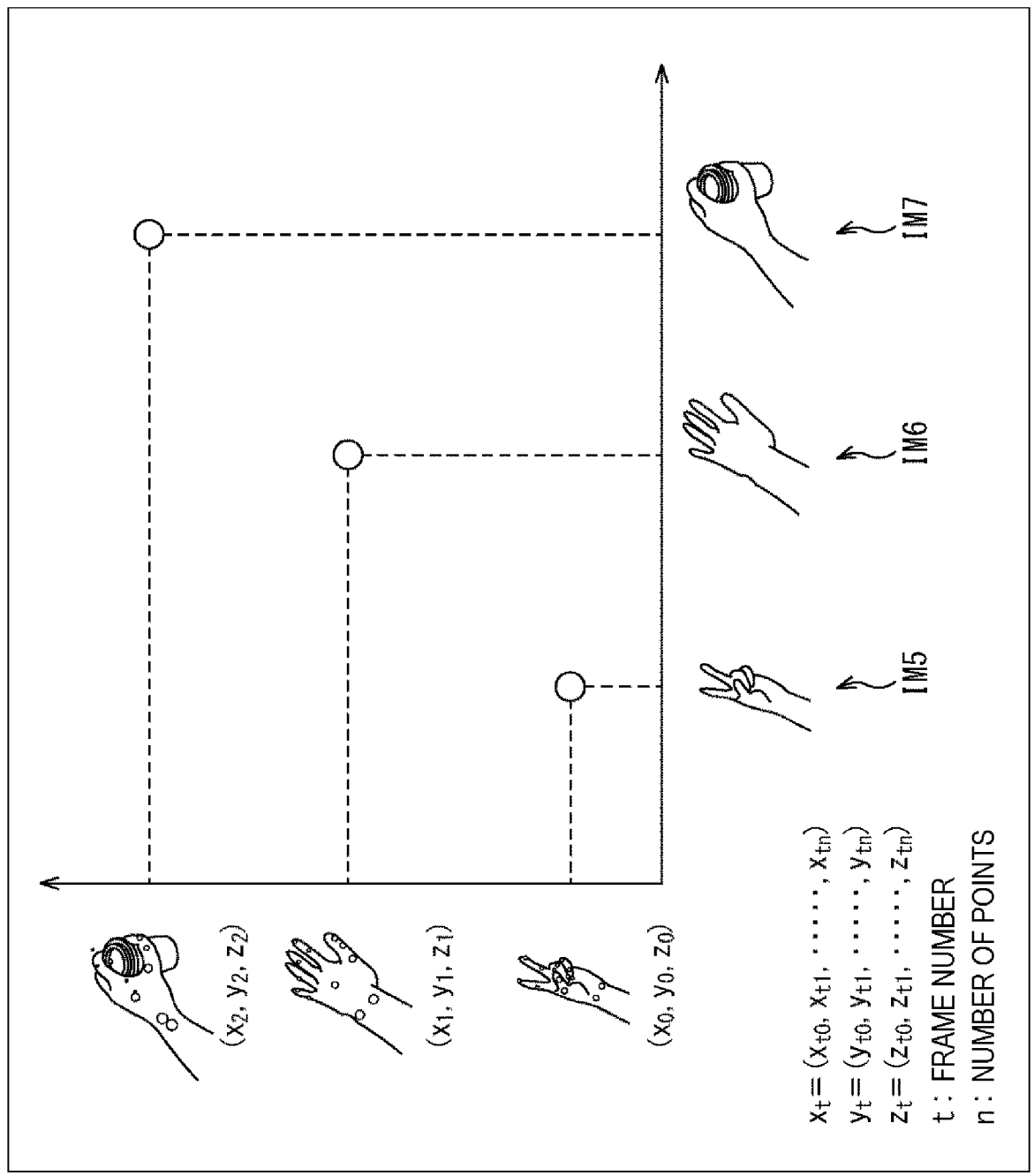
FIG. 14 illustrates an example of the three-dimensional position estimation method.

Next, an example of the three-dimensional position estimation method will be described with reference to FIGS. 14 to 16. A horizontal axis of a graph shown in FIG. 14 represents exemplary input images. In the example of FIG. 14, three input images IM5, IM6, and IM7 are shown. A vertical axis of the graph shown in FIG. 14 represents coordinates (positions) of hand feature points corresponding to the input image. The coordinates are expressed as (xt, yt, zt) (where t is a frame number). Furthermore, for example, xt is expressed as xt=(xt0, xt1 . . . xtn) (where n is the number of the feature points). That is, xt represents a set of x-coordinates of the feature points. yt and zt of the feature points are similar to xt.

Figure 15:
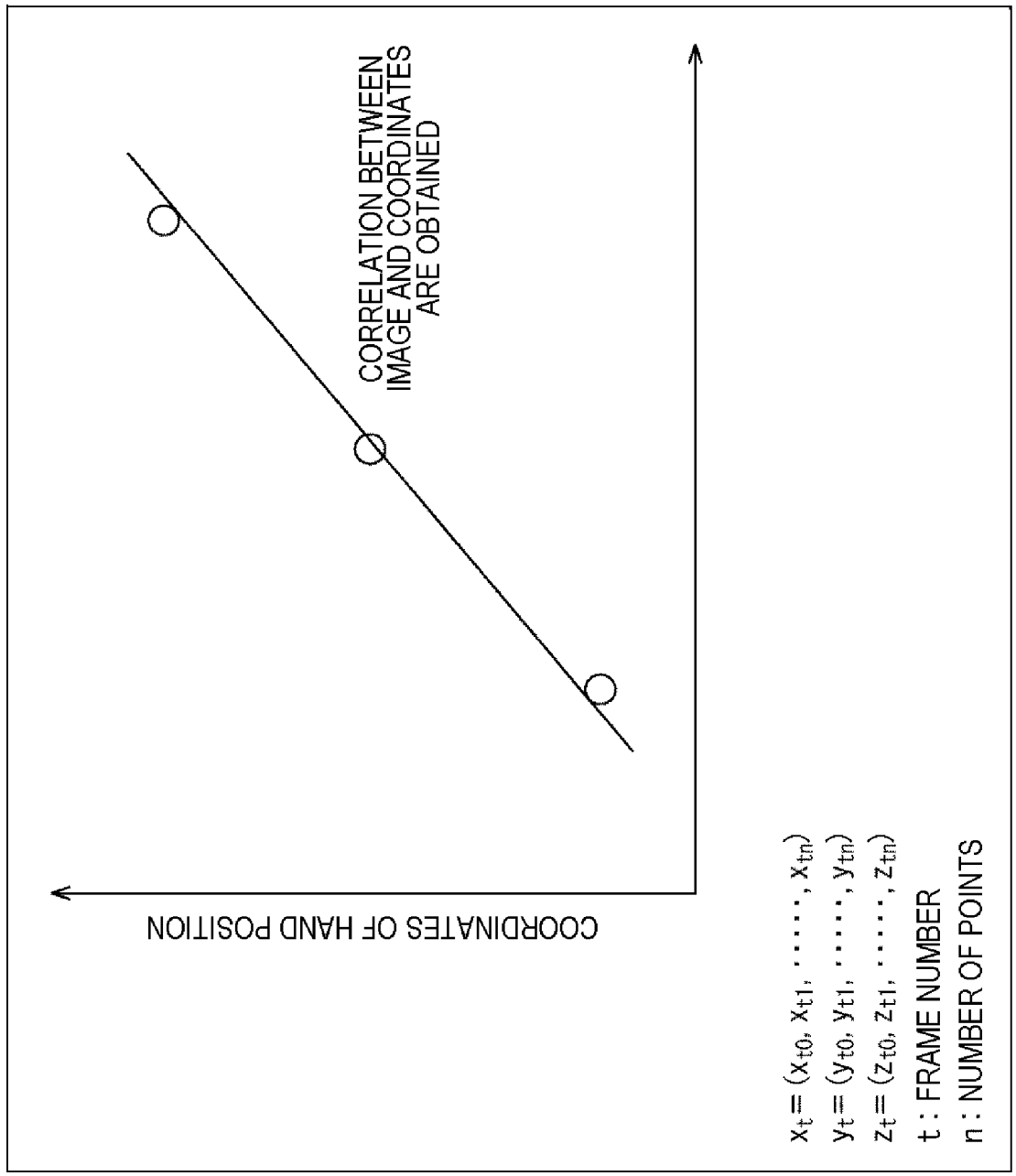
FIG. 15 illustrates the example of the three-dimensional position estimation method.

The three-dimensional position estimation unit 53 can obtain a correlation between the input image and the coordinates of the points on the hand as shown in FIG. 15 by learning the coordinates of the hand feature points with respect to the input image. Note that, in the example of FIG. 15, a linear correlation is shown as an example of the correlation between the input image and the coordinates of the points on the hand.

However, the correlation between the input image and the coordinates of the points on the hand may be another correlation (for example, non-linear or the like).

Figure 16:
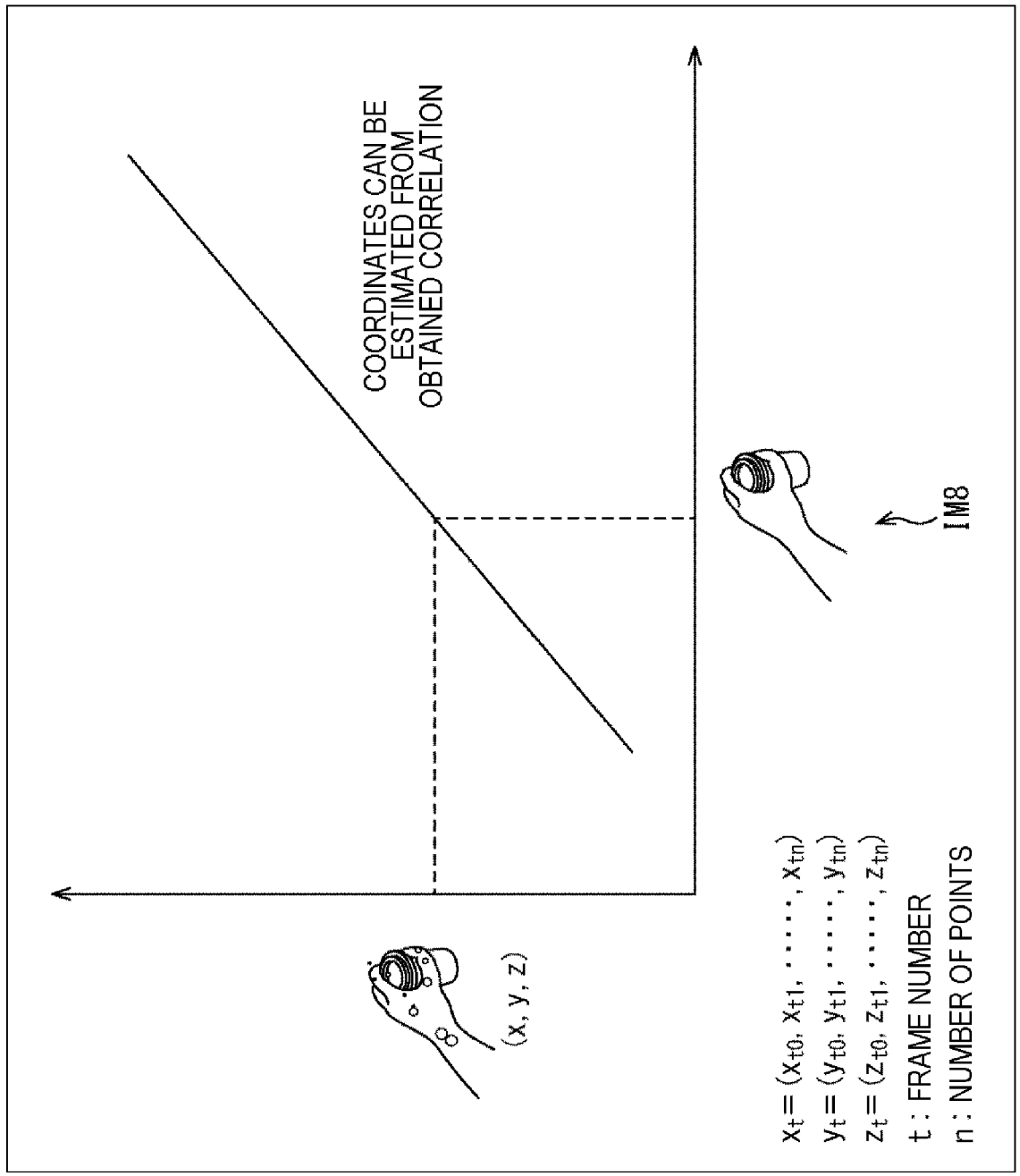
FIG. 16 illustrates the example of the three-dimensional position estimation method.

After obtaining the correlation between the input image and the coordinates of the points on the hand, the three-dimensional position estimation unit 53 can estimate, as shown in FIG. 16, when an image IM8 is input, a coordinate position of the hand of the image IM8 on the basis of the correlation. The three-dimensional position estimation unit 53 may estimate the positions of the points on the hand using the three-dimensional position estimation method described above. Note that a case where the coordinates of the hand feature points with respect to the input image are learned has been assumed here. However, in a case where the feature quantity is extracted from the input image before learning, the coordinates of the hand feature points with respect to the feature quantity may be learned.

Let us return to FIG. 2 to continue the description. The three-dimensional position estimation unit 53 stores the estimated three-dimensional position information of the points on the operation body (in the above description, the three-dimensional position information of the points on the user's hand) in the storage unit 58. The frame quantity determination unit 54 determines whether the three-dimensional position information corresponding to a predetermined frame quantity has been obtained by the three-dimensional position estimation unit 53 (that is, whether the three-dimensional position information corresponding to the predetermined frame quantity has been stored in the storage unit 58). The predetermined frame quantity is not particularly limited as long as it is two or more.

When the frame quantity determination unit 54 determines that the three-dimensional position information corresponding to the predetermined frame quantity has been obtained, the relative speed/relative position calculator 55 calculates absolute positions of the points on the operation body on the basis of the three-dimensional position information of the points on the operation body stored in the storage unit 58.

Then, the relative speed/relative position calculator 55 calculates a relative position of an operation point of the operation body with respect to a benchmark point of the operation body on the basis of the absolute positions of the points on the operation body. Note that, in the present specification, a case where the relative position is a three-dimensional vector is mainly assumed. However, the relative position may be a two-dimensional vector or a scalar.

Alternatively, the relative speed/relative position calculator 55 calculates absolute speeds of the points on the basis of changes in a time direction in the three-dimensional positions of the points on the operation body. Then, the relative speed/relative position calculator 55 calculates a relative speed of the operation point of the operation body with respect to the benchmark point of the operation body on the basis of the absolute speeds of the points. Specifically, when the relative speed of the operation point is "V (operation point relative speed)", the absolute speed of the operation point is "V (operation point absolute speed)", and the absolute speed of the benchmark point is "V (benchmark point absolute speed)", V (operation point relative speed) is calculated as indicated by following expression (1) based on V (operation point absolute speed) and V (benchmark point absolute speed).

$$V(\text{operation point relative speed}) = V(\text{operation point absolute speed}) - V(\text{benchmark point absolute speed}) \quad (1)$$

Note that, in the present specification, a case where the relative speed is a three-dimensional vector is mainly assumed. However, the relative position may be a two-dimensional vector or a scalar. The gesture recognition unit 56 recognizes a gesture made with the operation body on the basis of the relative position or the relative speed of the operation point with respect to the benchmark point of the operation body calculated by the relative speed/relative position calculator 55. This allows for higher accurate recognition of the gesture made with the operation body.

More specifically, the gesture recognition unit 56 recognizes a first gesture when the relative position or the relative speed of the operation point with respect to the benchmark point exceeds a threshold. Meanwhile, the gesture recognition unit 56 recognizes a second gesture different from the first gesture when the relative position or the relative speed of the operation point with respect to the benchmark point is the threshold or smaller. Note that, when the relative position or the relative speed of the operation point with respect to the benchmark point is equal to the threshold, the first gesture may be recognized. Furthermore, in a case where the relative position or the relative speed is a vector (a two-dimensional vector or three-dimensional vector), the relative position or the relative speed can be replaced with a length of the vector to be compared with the threshold.

Figure 17:
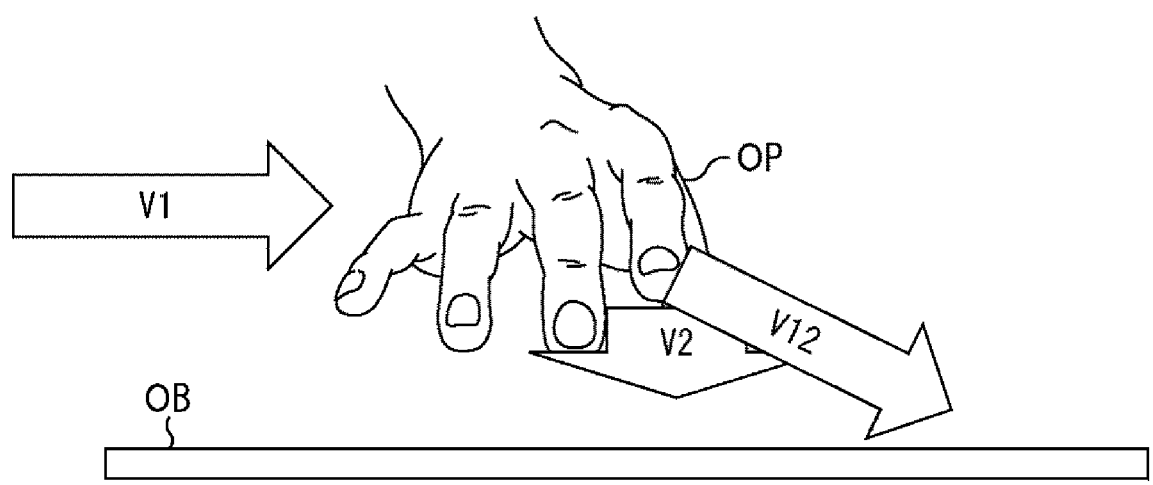
FIG. 17 is a diagram for explaining gesture recognition according to an embodiment of the present disclosure.

FIG. 17 is a diagram for explaining gesture recognition according to the embodiment of the present disclosure. Also in the example shown in FIG. 17, let us assume a case where the user attempts a key-in operation and moves a fingertip downward at a relative speed V2 with respect to a palm for the key-in operation while moving the palm in a right direction in the paper at an absolute speed V1 for a change of an input key. At this time, an absolute speed V12 of the fingertip results from combining the absolute speed V1 of the palm and the relative speed V2 of the fingertip with respect to the palm.

However, in the gesture recognition according to the embodiment of the present disclosure, the speed component caused by the change of the input key is eliminated and then whether the key-in operation has been performed is determined. This allows for highly accurate recognition of the key-in operation (the gesture made with the operation body).

Note that, hereinafter, let us mainly assume a case where the gesture recognition unit 56 recognizes a gesture made with the operation body on the basis of the relative speed of the operation point with respect to the benchmark point of the operation body. However, it is sufficient that the gesture recognition unit 56 recognizes the gesture made with the operation body on the basis of at least one of the relative position or the relative speed of the operation point with respect to the benchmark point of the operation body.

The command execution unit 57 can function as a command definition unit that defines a command corresponding to the gesture recognized by the gesture recognition unit 56. Additionally, the command execution unit 57 executes the defined command. Here, a type of the command to be executed by the command execution unit 57 is not limited. For example, the type of the command to be executed by the command execution unit 57 may be appropriately changed depending on an application executed in the information processing apparatus 32.

<Exemplary Command Corresponding to Gesture Made with Left and Right Hands of which Pairing has been Performed (Part 1)>

Figure 18:
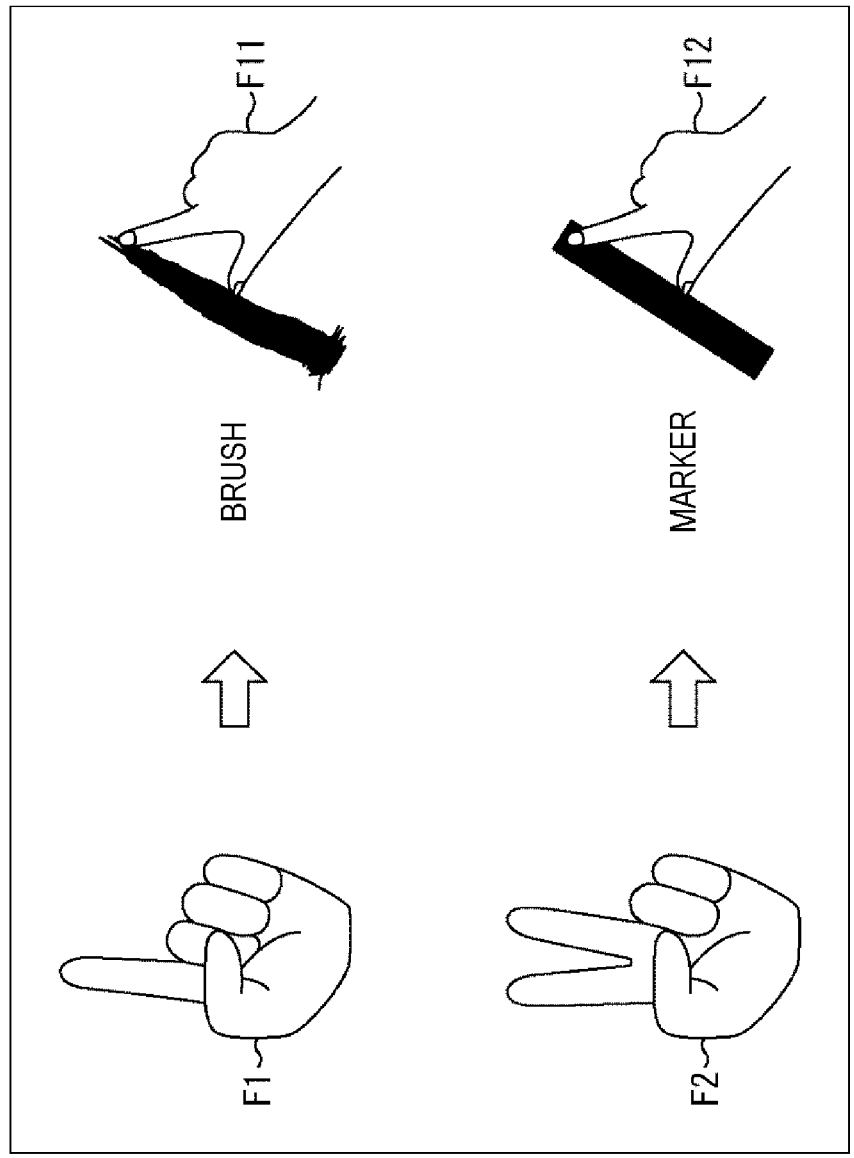
FIG. 18 is a diagram illustrating exemplary gestures made with left and right hands of which pairing has been performed.

As an exemplary command corresponding to the gesture made with the left and right hands of which the pairing has been performed, a command to display a drawing drawn with a pen like a brush along a path where the first finger of the right hand is run may be set when there is accepted, as an operation input, a left-hand gesture F1 of raising only the first finger and a right-hand gesture F11 of running the first finger in contact with the top surface of the table 71 as shown in the upper part of FIG. 18, for example.

Furthermore, a command to display a drawing drawn with a pen like a marker along a path where the first finger of the right hand is run may be set when there is accepted, as an operation input, a left-hand gesture F2 of raising the first and second fingers and a right-hand gesture F12 of running the first finger in contact with the top surface of the table 71 as shown in the lower part of FIG. 18, for example.

At this time, thickness and color of the pen as well as a type of the pen, etc. may seamlessly vary depending on a bending degree of the finger of the left hand.

<Exemplary Command Corresponding to Gesture (Part 2)>

Furthermore, a command to input a text character may be realized by a gesture made with the left and right hands of which the pairing has been performed.

More precisely, a command to input a character identified by a combination of a vowel and a consonant may be realized by the fingers of the left hand specifying the consonant and the first finger of the right hand specifying the vowel with a flick operation.

Figure 19:
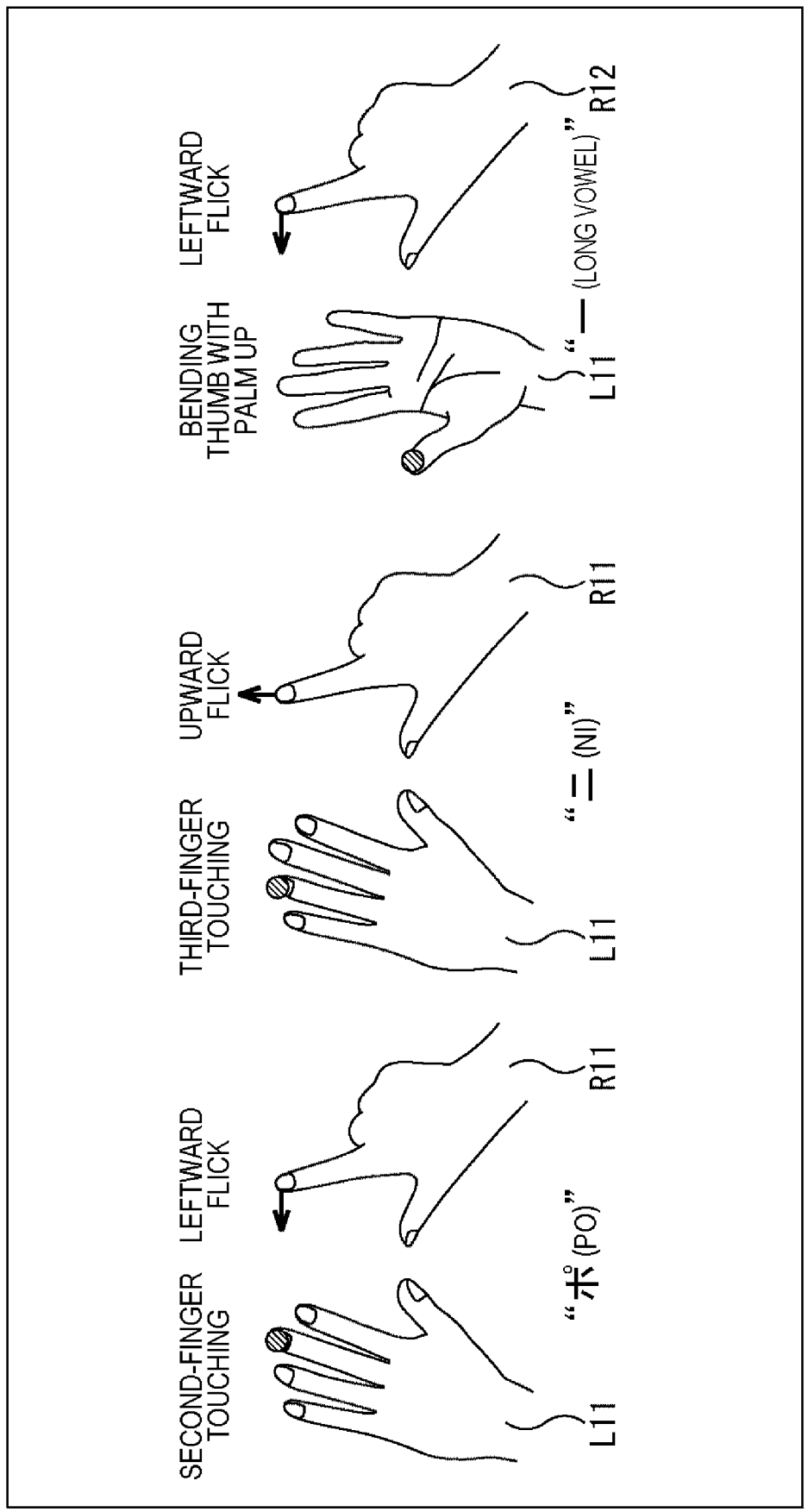
FIG. 19 is a diagram illustrating exemplary gestures made with left and right hands of which pairing has been performed.

For example, as shown in the left part of FIG. 19, when the second finger of the left hand L11 touches the top surface of the table 71 with the palm thereof down on the top surface of the table 71 and the first finger of the right hand R11 performs a leftward flick, the left hand identifies "p" as the consonant and the right hand identifies "o" as the vowel. This allows for accepting the input of a character "  (po)".

Additionally, as shown in the middle part of FIG. 19, when the third finger of the left hand L11 touches the top surface of the table 71 with the palm thereof down and the first finger of the right hand R11 performs an upward flick, the left hand identifies "n" as the consonant and the right hand identifies "i" as the vowel. This allows for accepting the input of a character "  (ni)".

Furthermore, as shown in the right part of FIG. 19, when the thumb of the left hand L11 touches the top surface of the table 71 with the palm thereof up on the top surface of the table 71 and the first finger of the right hand R11 performs an upward flick, the left hand identifies special sounds such as a double consonant, a syllabic nasal, a contracted sound, and a long vowel and the right hand identifies the "long vowel" as the vowel. This allows for accepting the input of a character "— (long vowel)".

Then, successively accepting, as the operation inputs, the gestures in FIG. 19 in order from the left in the figure may result in accepting the input of the text characters of "ポニー".

<Exemplary Command Corresponding to Gesture (Part 3)>

Furthermore, a command to manipulate an image may be realized by a gesture made with the left and right hands of which the pairing has been performed.

Figure 20:
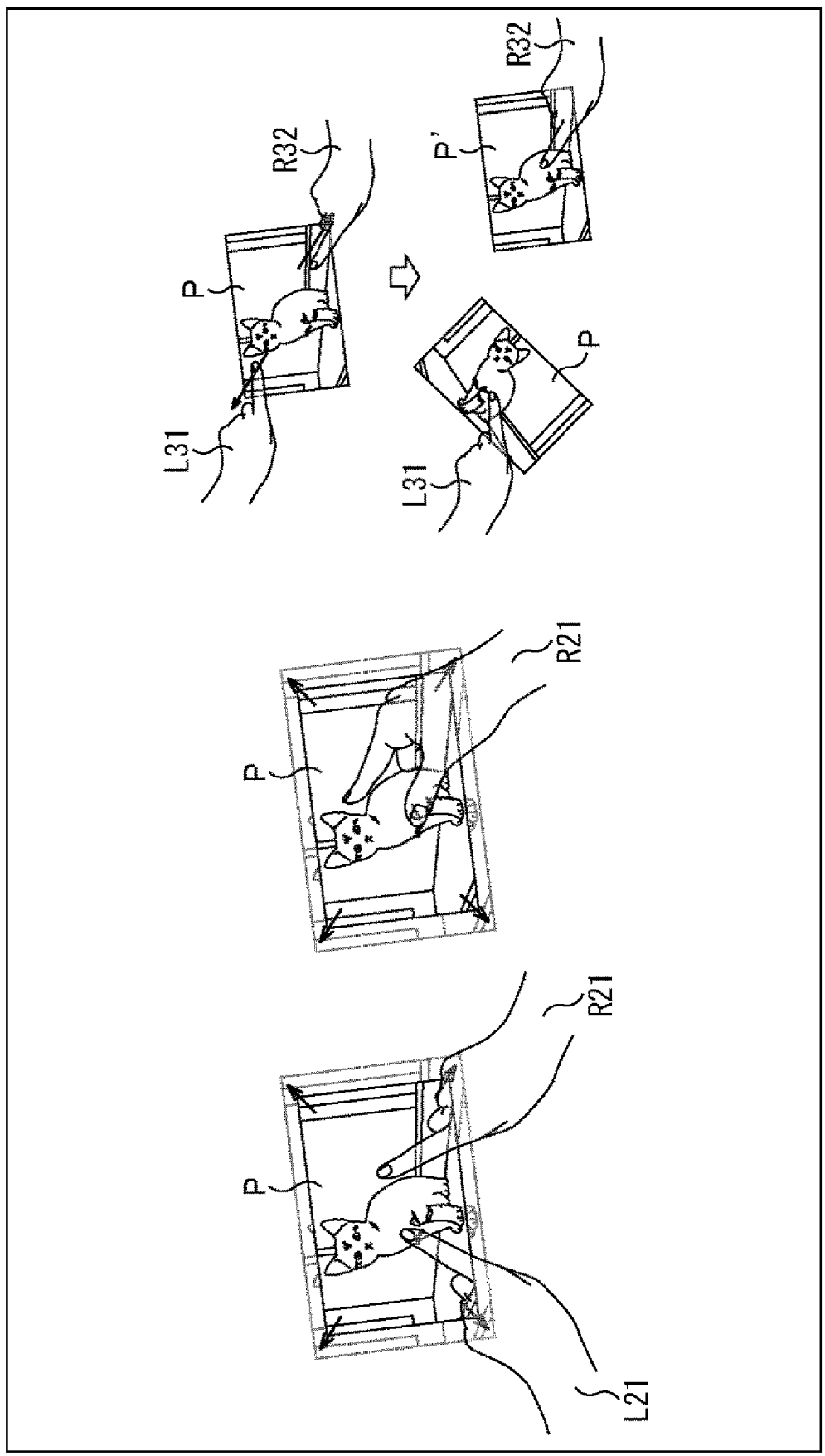
FIG. 20 is a diagram illustrating exemplary gestures made with left and right hands of which pairing has been performed.

More precisely, as shown in the left part of FIG. 20, when there is accepted, as an operation input, a gesture of changing a distance between the respective first fingers of the paired left hand L21 and right hand R21 with the first fingers in contact with an image P displayed on the table 71, a command to enlarge or reduce a size of the image P for display depending on the mutual distance may be realized. That is, as the distance between the respective fingers of the left hand L21 and the right hand R21 increases and the fingers separate from each other, the image P may be enlarged. As the distance between the respective fingers of the left hand L21 and the right hand R21 decreases and the fingers approach each other, the image P may be reduced.

Furthermore, when there is accepted, as an operation input, a gesture of changing a mutual distance of the first finger and the thumb of only the right hand R21 with the first finger and the thumb in contact with the image P, a command to enlarge or reduce the size of the image P for display depending on the distance between the first finger and the thumb may be realized.

Furthermore, as shown in the right upper part of FIG. 20, when there is accepted, as an operation input, a gesture of changing positions of the first fingers of the unpaired left hand L31 and right hand R31 such that they separate from each other with the respective first fingers in contact with the image P displayed on the table 71 as shown in the left lower part of FIG. 20, a command to copy the image P, P' for display at the respective positions of the first fingers may be realized. Note that the right upper part of FIG. 20 illustrates an example of using the left hand L31 and the right hand R31. However, the hands may be both right hands or both left hands since they may be unpaired.

Furthermore, a command not only for image manipulation but also for system operation may be realized.

For example, a command to order a system operation may be realized by one of the paired left and right hands, such as a command to order a copy operation by the first and second fingers touching each other for longer than a predetermined time (hereinafter, also referred to as long touching) and a command to order a cut operation or the like by the first and third fingers long touching each other.

Furthermore, a command may be realized by the paired left and right hands, such as a command to order screen scrolling by the left hand in contact with the top surface of the table 71 and the first finger of the right hand performing a drag and a command to order a page jump by the right hand in contact with the top surface of the table 71 and the first finger of the left hand performing a drag.

Moreover, a command to order data save may be realized by the paired left and right hands held together.

Furthermore, in a case where the unpaired hands are held together, when the hands held together are both left hands or both right hands, a command to order data exchange between the users may be realized, and, when the hands held together are a right hand and a left hand, a command to order data transfer from the user with the left hand to the user with the right hand or from the user with the left hand to the user with the right hand may be realized.

Furthermore, in the case where the unpaired hands are held together, when the hands other than the hands held together form a same shape (for example, when the hands are both open, closed, or the like), a command to order data exchange between the users may be realized, and, when the hands other than the hands held together form different shapes, a command to order data transfer from the user with the hand forming a first shape to the user with the hand forming a second shape may be realized.

3. Information Processing by Information Processing System

Figure 21:
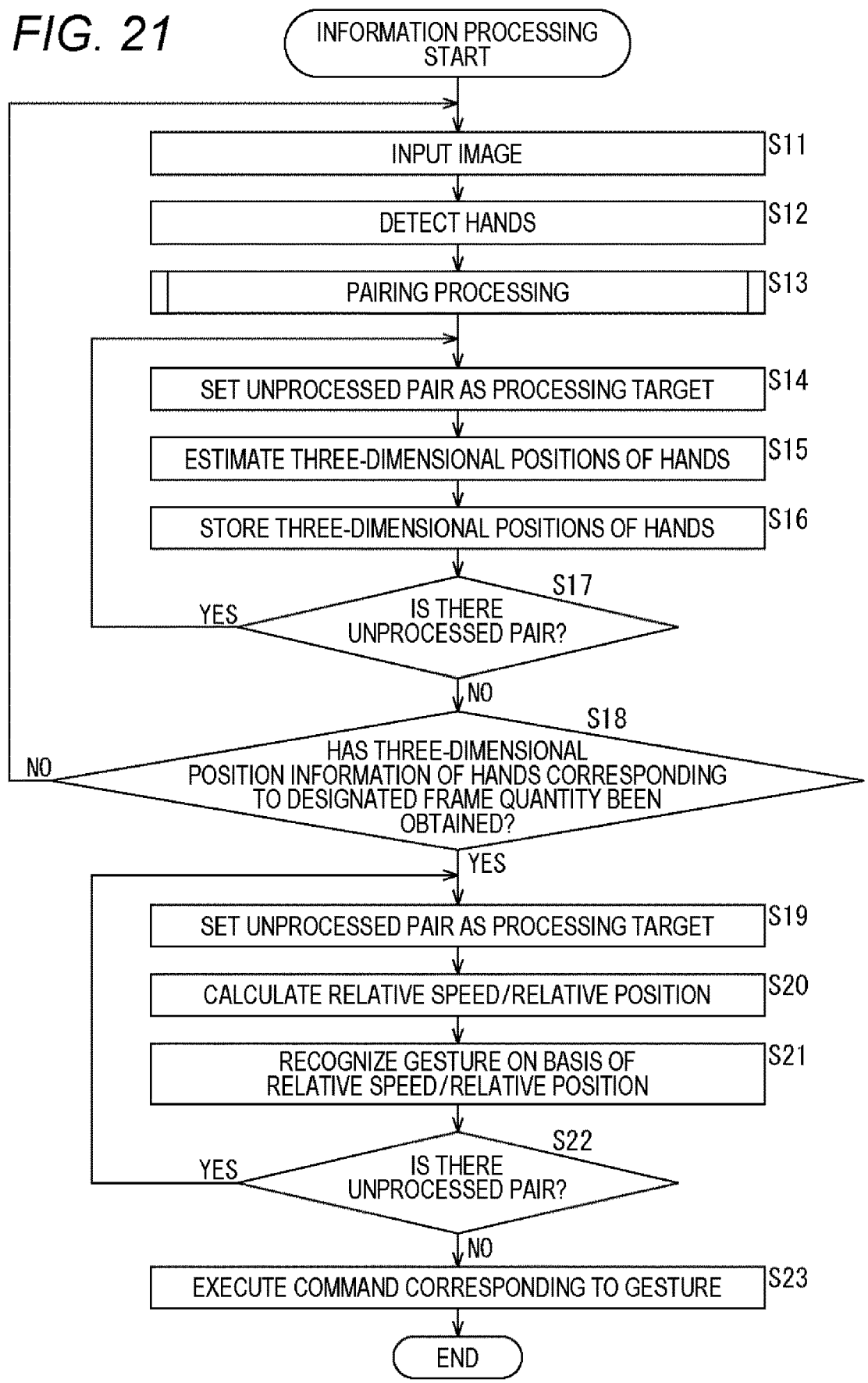
FIG. 21 is a flowchart illustrating information processing of the information processing system in FIG. 2.

Next, information processing by the information processing system 11 according to the embodiment of the present disclosure will be described with reference to a flowchart of FIG. 21.

In step S11, the input unit 31 accepts input (acquisition) of an image in which the user's hands as an exemplary operation body are captured (sensed) along the time axis by, for example, the image sensor such as a camera.

In step S12, the hand detector 51 detects positions of the hands in the image on the basis of the image obtained by the input unit 31. More precisely, the hand detector 51 recognizes an arm region in the image, recognizes a palm region at an end of the recognized arm region, and recognizes a right hand or a left hand according to an orientation of the thumb or the like in the palm region. The respective recognition results are detected as the position of the hand in the image. At this time, the hand detector 51 recognizes each of the detected hands as a left hand or a right hand, and outputs the base positions of the respective arms to the pairing unit 52 as a hand detection result.

In step S13, the pairing unit 52 executes the pairing processing on the basis of the hand detection result to perform the pairing of the respective left and right hands as the hands of a same person.

Figure 23:
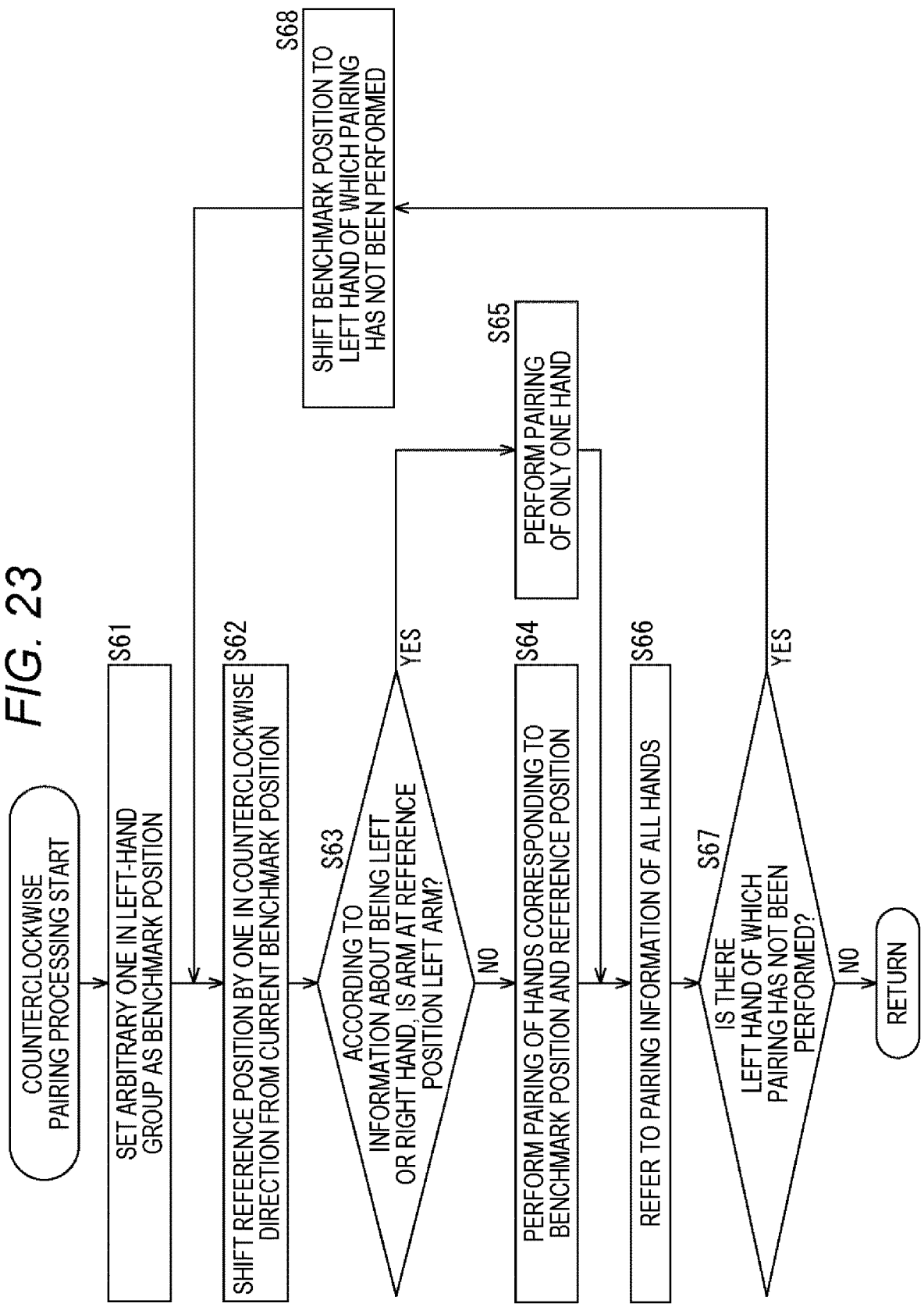
FIG. 23 is a flowchart illustrating counterclockwise pairing processing in FIG. 22.
Figure 24:
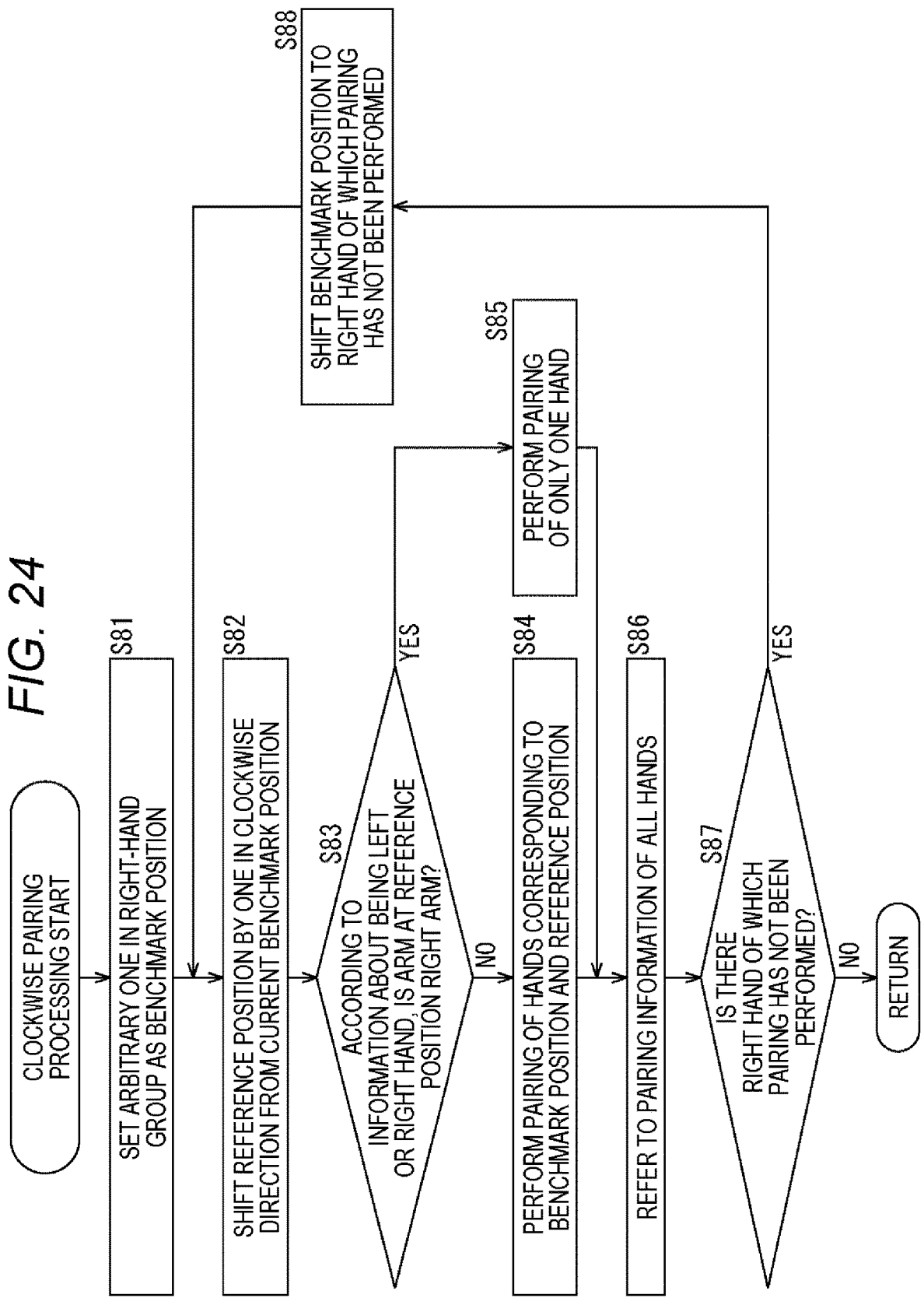
FIG. 24 is a flowchart illustrating clockwise pairing processing in FIG. 23.

Note that the pairing processing will be described later in detail with reference to flowcharts of FIGS. 22 to 24.

In step S14, the three-dimensional position estimation unit 53 sets any unprocessed pair as a processing target among the pairs of right and left hands (including the pair associated with only a right hand or only a left hand) set by the pairing processing.

In step S15, the three-dimensional position estimation unit 53 estimates the three-dimensional positions of the points on each hand for the pair of the right and left hands set as the processing target in the image obtained by the input unit 31. Note that the points of which three-dimensional positions are estimated by the three-dimensional position estimation unit 53 are not limited to the points on the user's hand as described above.

In step S16, the three-dimensional position estimation unit 53 stores the three-dimensional positions of the pair of the right and left hands set as the processing target in the storage unit 58 in association with the pair.

In step S17, the three-dimensional position estimation unit 53 determines whether or not there is an unprocessed pair among the pairs of right and left hands set by the pairing processing in the image obtained by the input unit 31.

In step S17, if there is an unprocessed pair, the processing returns to step S14.

That is, the processing of steps S14 to S17 is repeatedly performed until there is no unprocessed pair of right and left hands in the image obtained by the input unit 31, and each piece of three-dimensional position information is stored in the storage unit 58.

Then, in step S17, if it is determined that there is no unprocessed pair of right and left hands in the image obtained by the input unit 31, the processing proceeds to step S18.

In step S18, the frame quantity determination unit 54 determines whether the three-dimensional position estimation unit 53 has obtained the three-dimensional position information corresponding to a designated frame quantity (the predetermined frame quantity).

In step S18, if it is determined that the three-dimensional position estimation unit 53 has not obtained the three-dimensional position information corresponding to the designated frame quantity (the predetermined frame quantity), the processing returns to the processing of step S11.

Meanwhile, in step S18, if it is determined that the three-dimensional position estimation unit 53 has obtained the three-dimensional position information corresponding to the designated frame quantity (the predetermined frame quantity), the processing proceeds to step S19.

In step S19, the relative speed/relative position calculator 55 sets a pair of which the three-dimensional position information is unprocessed as a processing target among the pairs stored in the storage unit 58.

In step S20, the relative speed/relative position calculator 55 calculates, on the basis of the three-dimensional position information of the respective points on the pair of the right and left hands set as the processing target among the pairs stored in the storage unit 58, the absolute positions of the respective points on the right and left hands.

Then, the relative speed/relative position calculator 55 calculates, on the basis of the absolute positions of the respective points on the pair of the right and left hands set as the processing target, the relative positions of hand operation points with respect to benchmark points of the pair of the right and left hands set as the processing target.

Alternatively, the relative speed/relative position calculator 55 calculates, on the basis of the changes in the time direction in the three-dimensional positions of the respective points on the pair of the right and left hands set as the processing target, the absolute speeds of the points.

Then, the relative speed/relative position calculator 55 calculates, on the basis of the absolute speeds of the points, the respective relative speeds of the hand operation points with respect to the hand benchmark points of the pair of the right and left hands set as the processing target.

In step S21, the gesture recognition unit 56 recognizes a hand gesture on the basis of the respective relative positions or relative speeds of the operation points with respect to the hand benchmark points of the operation bodies calculated by the relative speed/relative position calculator 55, the operation bodies being the pair of the right and left hands set as the processing target.

In step S22, the relative speed/relative position calculator 55 determines whether or not there is a pair of which the three-dimensional position information is unprocessed among the pairs stored in the storage unit 58.

In step S22, if it is determined that there is a pair of which the three-dimensional position information is unprocessed in the information about three dimensional positions of the pairs stored in the storage unit 58, the processing returns to step S19.

That is, the processing of steps S19 to S22 is repeatedly performed until gestures are recognized for all the pairs stored in the storage unit 58.

Then, the gestures are recognized for all the pairs, and in step S22, if it is determined that the gestures are recognized for all the pairs, the processing proceeds to step S23.

That is, the processing of steps S19 to S23 allows for higher accurate recognition of the respective hand gestures made with the right and left hands for all the pairs stored in the storage unit 58.

More specifically, the gesture recognition unit 56 can recognize, for example, the gestures such as those described with reference to FIGS. 18 to 20 described above, on the basis of the relative positions or the relative speeds of the operation points with respect to the benchmark points.

In step S24, the command execution unit 57 defines commands corresponding to the respective hand gestures that are made with the right and left hands for all the pairs and recognized by the gesture recognition unit 56.

Then, the command execution unit 57 executes the commands corresponding to the respective hand gestures that are made with the right and left hands for all the pairs and recognized by the gesture recognition unit 56.

As described above, the type of the command to be executed by the command execution unit 57 may be appropriately changed depending on an application executed in the information processing apparatus 32.

<Pairing Processing>

Next, the pairing processing will be described with reference to the flowchart of FIG. 22.

In step S41, the pairing unit 52 recognizes right hands and left hands and detects the base positions of the respective arms on the basis of the image obtained by the input unit 31.

That is, there are detected here the position information of the right and left hands in the image obtained by the input unit 31 and the position information of the bases of the respective arms that are continuous with the right and left hands and positioned on the table 71 at an edge of the image.

In step S42, the pairing unit 52 determines whether or not a left hand is present in the detection result.

In step S42, if it is determined that at least one left hand is present, the processing proceeds to step S43.

In step S43, the pairing unit 52 executes the counterclockwise pairing processing to set all the left hands and the right hands in the image obtained by the input unit 31 as pairs.

Note that the counterclockwise pairing processing will be described later in detail with reference to a flowchart of FIG. 23.

Meanwhile, in step S42, if it is determined that no left hand is present, the processing proceeds to step S44.

In step S44, the pairing unit 52 executes the clockwise pairing processing to set all the left hands and the right hands in the image obtained by the input unit 31 as pairs.

Note that the clockwise pairing processing will be described later in detail with reference to a flowchart of FIG. 24.

In step S45, the pairing unit 52 calculates a distance between the base positions of the arms for all the pairs.

In step S46, the pairing unit 52 determines whether or not the distance between the base positions of the arms is within a predetermined distance for all the pairs. Note that, as for the pair associated with only a left hand or only a right hand, the distance is taken as being within the predetermined distance since the distance is indeterminate.

In step S46, if it is determined that the distance between the base positions of the arms is longer than the predetermined distance for any one of the pairs, the processing proceeds to step S47.

In step S47, as described with reference to FIG. 8, the pairing unit 52 splits the pair of the right and left hands for which the distance between the base positions of the arms is longer than the predetermined distance to set the hands as respective different pairs.

Note that, in this case, the split right and left hands are both single but only the single right hand or left hand is counted as a pair.

Meanwhile, in step S46, if it is determined that the distance between the base positions of the arms is within the predetermined distance for all the pairs, the processing of step S47 is skipped.

By the above processing, the right hands and the left hands are set as the pairs, and as for the pair for which the distance between the bases of the respective arms is longer than the predetermined distance, only the left hand and only the right hand are individually set as single pairs.

Note that the counterclockwise pairing processing or the clockwise pairing processing is determined depending on whether or not a left hand is present since the counterclockwise pairing processing uses a left hand as the benchmark position and the clockwise pairing processing uses a right hand as the benchmark position. Thus, in the processing of the flowchart of FIG. 22, in a case where no left hand is present, a right hand is assumed to be present. However, in a case where neither left hand nor right hand is present, the processing may end. Furthermore, in order to perform highly accurate pairing, both the counterclockwise pairing processing and the clockwise pairing processing are used for the pairing. However, in a case where all the users are assumed to place both the left and right hands on the operation surface that is the top surface of the table 71, or by setting, only one of the counterclockwise pairing processing and the clockwise pairing processing may be used.

<Counterclockwise Pairing Processing>

Next, the counterclockwise pairing processing will be described with reference to the flowchart of FIG. 23.

In step S61, the pairing unit 52 sets the base position of an arbitrary arm in a left-hand group in the detection result as the benchmark position.

In step S62, the pairing unit 52 sets the base position of the arm of the hand that is closest to the current benchmark position in the counterclockwise direction along the periphery of the table 71 as the reference position.

In step S63, the pairing unit 52 determines whether or not the hand of the arm set as the reference position is a left hand.

In step S63, if it is determined that the hand of the arm set as the reference position is not a left hand, that is, if it is determined that the hand of the arm set as the reference position is a right hand, the processing proceeds to step S64.

In step S64, the pairing unit 52 sets the right hand and the left hand of the arms having the bases positioned at the benchmark position and the reference position as a pair.

Meanwhile, in step S63, if it is determined that the hand of the arm set as the reference position is a left hand, that is, if it is determined that the hand of the arm set as the reference position and the hand of the arm set as the benchmark position are both left hands, the processing proceeds to step S65.

In step S65, the pairing unit 52 sets the two left hands of the arms having the bases positioned at the benchmark position and the reference position as different pairs each associated with only a left hand.

In step S66, the pairing unit 52 acquires information about the left and right hands set as the pair.

In step S67, the pairing unit 52 determines whether or not there is an unprocessed left hand of which the pairing has not been performed.

In step S67, if it is considered that there is an unprocessed left hand, the processing proceeds to step S68.

In step S68, the pairing unit 52 sets the base position of the arm of the left hand of which the pairing has not been performed in the left-hand group as the benchmark position, and the processing returns to step S62.

That is, the processing of steps S62 to S68 is repeatedly performed until there is no unprocessed left hand, and the pairs are sequentially set as described with reference to FIG. 4.

Then, in step S67, if it is considered that all the hands are set as the pairs and there is no unprocessed left hand, the processing ends.

By the above processing, the pairs are set by repeatedly performing the processing of sequentially setting the base position of the arm of the left hand as the benchmark position and setting the right hand of which position is counterclockwise close along a periphery direction of the table 71 as the pair.

At this time, in a case where the hand that is closest adjacent to the left hand in the counterclockwise direction is a left hand, the hands are individually set as different single pairs each associated with only a left hand, and thus all the hands are set as the pairs.

<Clockwise Pairing Processing>

Next, the clockwise pairing processing will be described with reference to the flowchart of FIG. 24.

In step S81, the pairing unit 52 sets the base position of an arbitrary arm in a right-hand group in the detection result as the benchmark position.

In step S82, the pairing unit 52 sets the base position of the arm of the hand that is closest to the current benchmark position in the clockwise direction along the periphery of the table 71 as the reference position.

In step S83, the pairing unit 52 determines whether or not the hand of the arm set as the reference position is a right hand.

In step S83, if it is determined that the hand of the arm set as the reference position is not a right hand, that is, if it is determined that the hand of the arm set as the reference position is a left hand, the processing proceeds to step S84.

In step S84, the pairing unit 52 sets the right hand and the left hand of the arms having the bases positioned at the benchmark position and the reference position as a pair.

Meanwhile, in step S83, if it is determined that the hand of the arm set as the reference position is a right hand, that is, if it is determined that the hand of the arm set as the reference position and the hand of the arm set as the benchmark position are both right hands, the processing proceeds to step S85.

In step S85, the pairing unit 52 sets the two right hands of the arms having the bases positioned at the benchmark position and the reference position as respective different odd pairs each associated with only a right hand.

In step S86, the pairing unit 52 acquires information about the left and right hands set as the pair.

In step S87, the pairing unit 52 determines whether or not there is an unprocessed right hand of which the pairing has not been performed.

In step S87, if it is considered that there is an unprocessed right hand, the processing proceeds to step S88.

In step S88, the pairing unit 52 sets the base position of the arm of the right hand of which the pairing has not been performed in the right-hand group as the benchmark position, and the processing returns to step S82.

That is, the processing of steps S82 to S88 is repeatedly performed until there is no unprocessed right hand, and the pairs are sequentially set as described with reference to FIG. 5.

Then, in step S87, if it is considered that all the hands are set as the pairs and there is no unprocessed right hand, the processing ends.

By the above processing, the pairs are set by repeatedly performing the processing of sequentially setting the base position of the arm of the right hand as the benchmark position and setting the left hand of which position is clockwise close along a periphery direction of the table 71 as the pair.

At this time, in a case where the hand that is closest adjacent to the right hand in the clockwise direction along the periphery of the table 71 is a right hand, the hands are individually set as single pairs each associated with only a right hand, and thus all the hands are set as the pairs.

The above sequential processing allows for, when hand-based operation inputs from the plurality of users are accepted, appropriate pairing of left and right hands for each user.

<Another Example of Pairing Processing>

In the pairing processing described with reference to FIG. 22, an example has been described in which whether to perform the counterclockwise pairing processing or the clockwise pairing processing is determined depending on the presence or absence of a left hand. However, whether to perform the counterclockwise pairing processing or the clockwise pairing processing may be determined depending on the presence or absence of a right hand.

Thus, another example of the pairing processing in which whether to perform the counterclockwise pairing processing or the clockwise pairing processing is determined depending on the presence or absence of a right hand will be described with reference to FIG. 25.

Figure 22:
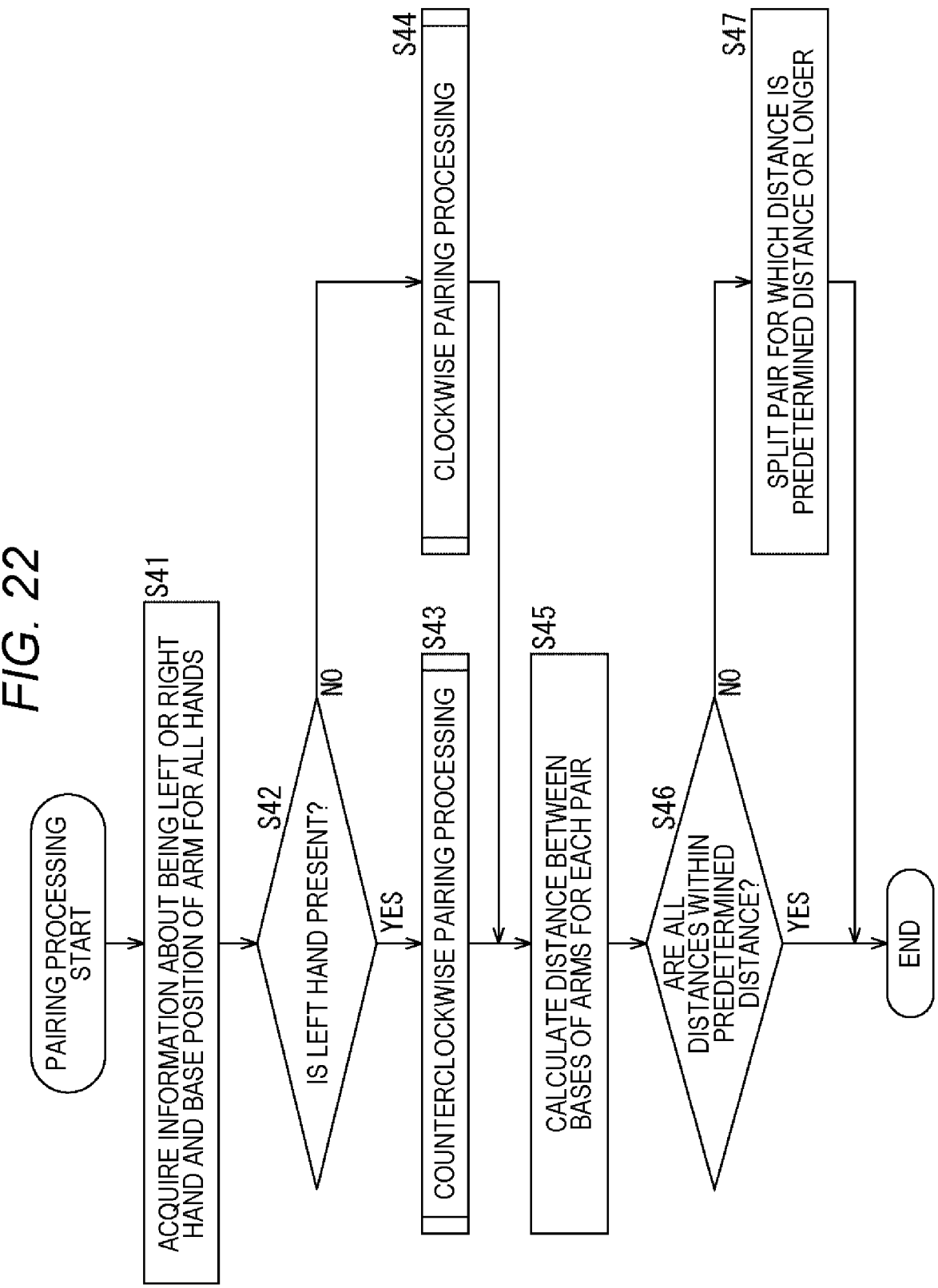
FIG. 22 is a flowchart illustrating pairing processing in FIG. 21.
Figure 25:
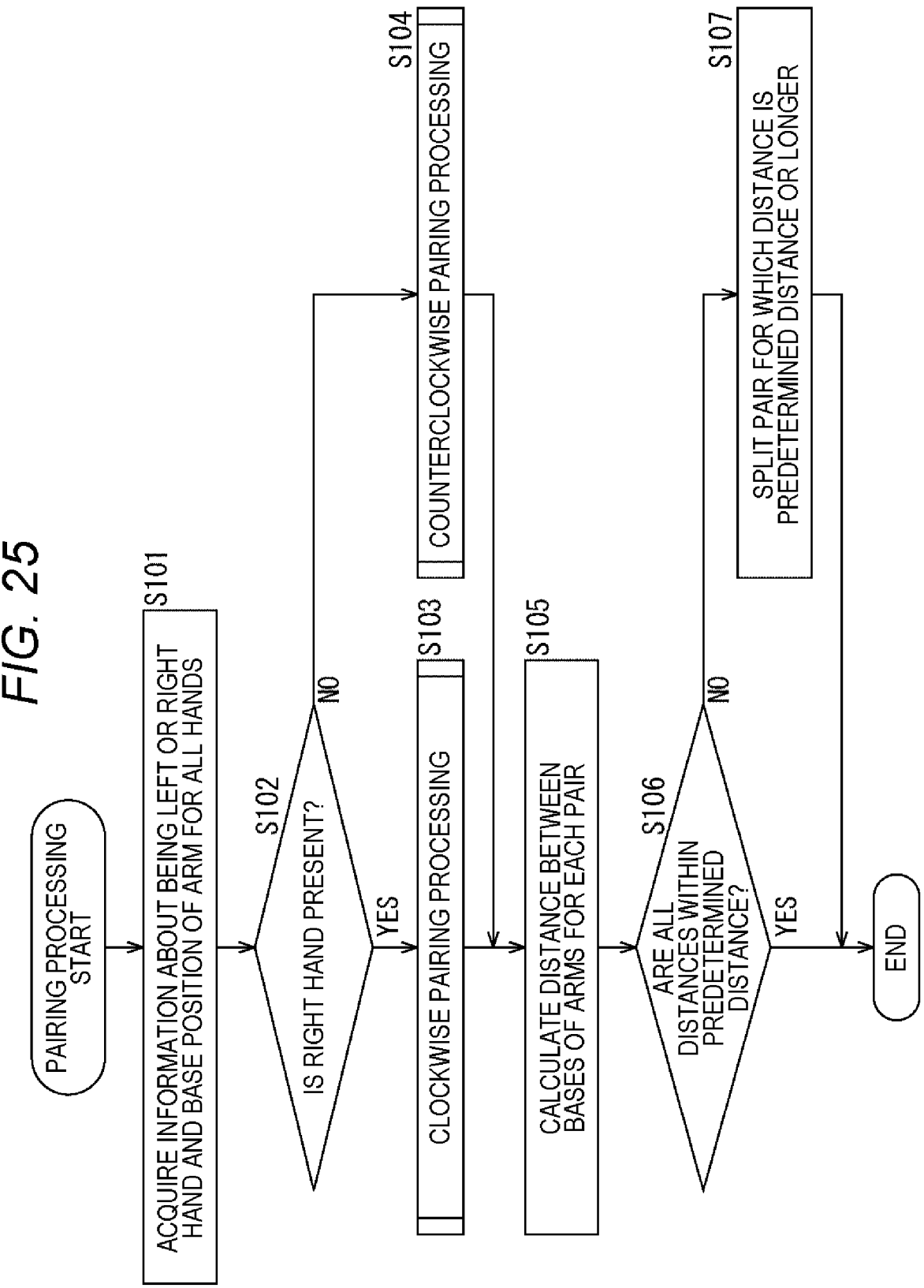
FIG. 25 is another flowchart illustrating the pairing processing in FIG. 21.

Note that the processing of steps S101, S104, S103, and S105 to S107 in a flowchart of FIG. 25 is similar to the processing of steps S41 and S43 to S47 in the flowchart of FIG. 22, and thus description thereof is omitted.

That is, in step S102, the pairing unit 52 determines whether or not a right hand is present in the detection result.

In step S102, if it is determined that at least one right hand is present, the processing proceeds to step S103, and the clockwise pairing processing is executed.

Meanwhile, in step S102, if it is determined that no right hand is present, the processing proceeds to step S104, and the counterclockwise pairing processing is executed.

Note that, in the pairing processing, whether to perform the processing of FIG. 22 or the processing of FIG. 25 may be chosen.

4. Example of Execution by Software

By the way, the above sequential processing can be executed by hardware, and also by software. In a case where the sequential processing is executed by the software, a program constituting the software is installed from a recording medium to a computer incorporated in dedicated hardware or to a general-purpose computer or the like capable of executing various functions by installed various programs, for example.

Figure 26:
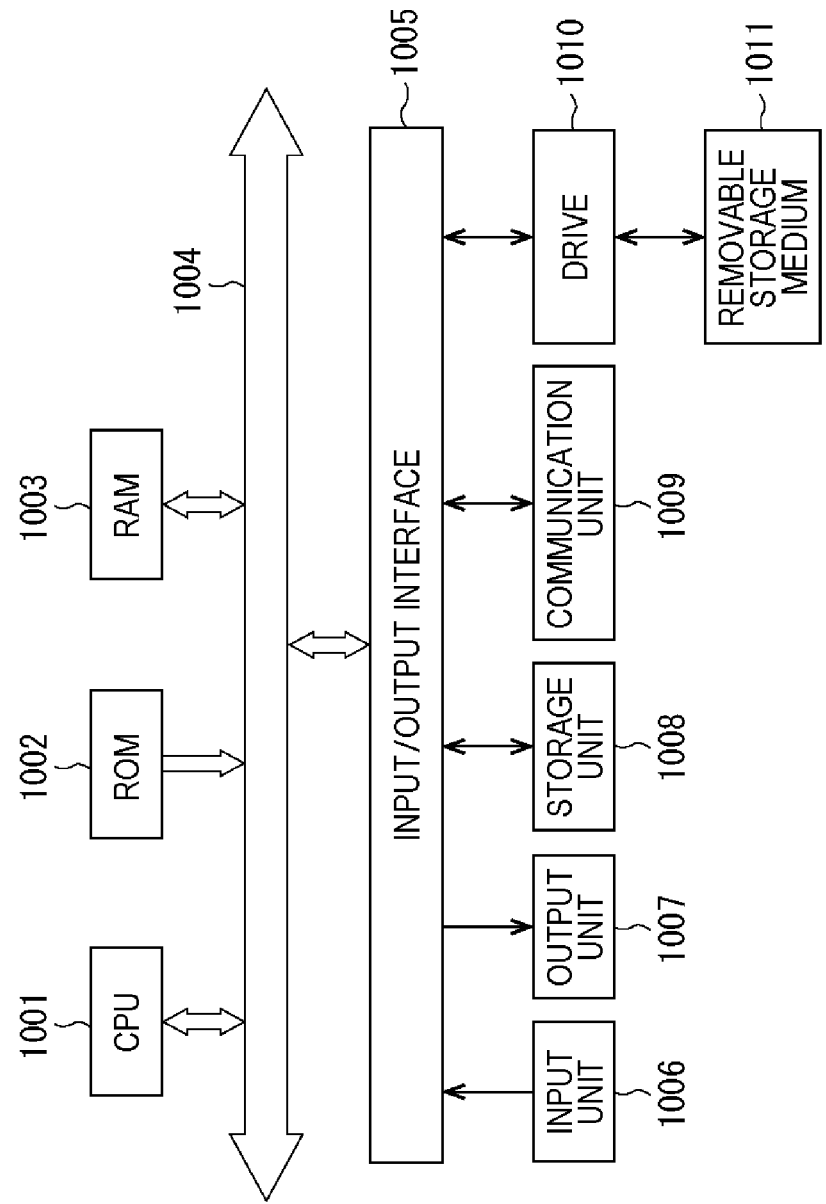
FIG. 26 is a diagram illustrating a configuration example of a general-purpose personal computer.

FIG. 26 shows a configuration example of the general-purpose computer. This personal computer includes a central processing unit (CPU) 1001. The CPU 1001 is connected with an input/output interface 1005 via a bus 1004. The bus 1004 is connected with a read only memory (ROM) 1002 and a random access memory (RAM) 1003.

The input/output interface 1005 is connected with an input unit 1006 including an input device such as a keyboard and a mouse with which a user inputs an operation command, an output unit 1007 that outputs an operation screen for processing and an image of a processing result to a display device, a storage unit 1008 including a hard disk drive or the like that stores programs and various types of data, and a communication unit 1009 that includes a local area network (LAN) adapter and the like and executes communication processing via a network represented by the Internet. Additionally, the input/output interface 1005 is connected with a drive 1010 that reads and writes data from and to a removable storage medium 1011 such as a magnetic disk (including a flexible disk), an optical disk (including a compact disc-read only memory (CD-ROM) and a digital versatile disc (DVD)), a magneto-optical disk (including a mini disc (MD)), or a semiconductor memory.

The CPU 1001 executes various types of processing according to a program stored in the ROM 1002 or a program that has been read from the removable storage medium 1011 such as a magnetic disk, an optical disk, a magneto-optical disk, or a semiconductor memory, installed in the storage unit 1008, and loaded from the storage unit 1008 onto the RAM 1003. The RAM 1003 also stores data and the like as appropriate that is necessary for the CPU 1001 to execute the various types of processing.

In the computer configured as described above, for example, the CPU 1001 loads the program stored in the storage unit 1008 onto the RAM 1003 via the input/output interface 1005 and the bus 1004 to execute the program, and thus performs the above-described sequential processing.

The program executed by the computer (CPU 1001) can be recorded for provision, for example, in the removable storage medium 1011 that is a package medium or the like. Furthermore, the program can be provided via a wired or wireless transmission medium of a local area network, the Internet, digital satellite broadcasting, or the like.

In the computer, the program can be installed in the storage unit 1008 via the input/output interface 1005 by attaching the removable storage medium 1011 to the drive 1010. Alternatively, the program can be installed in the storage unit 1008 by receiving it at the communication unit 1009 via the wired or wireless transmission medium. In addition, the program can be installed in advance in the ROM 1002 or the storage unit 1008.

Note that the program executed by the computer may be a program in which processes are performed in the chronological order described in the present specification, or may be a program in which the processes are parallelized or performed at a necessary timing such as calling.

Note that the CPU 1001 in FIG. 26 implements the functions of the information processing apparatus 32 in FIG. 2.

Furthermore, in the present specification, a system means a set of multiple components (apparatuses, modules (parts), etc.), and whether or not all the components are in a same housing does not matter. Thus, multiple apparatuses that are housed in separate housings and are connected with each other via a network, and one apparatus having multiple modules housed in one housing are both systems.

Note that embodiments of the present disclosure are not limited to the above-described embodiment, and various modifications can be made without departing from the gist of the present disclosure.

For example, the present disclosure may adopt a configuration of cloud computing in which one function is shared and collaboratively performed by a plurality of apparatuses via a network.

Furthermore, each step described in the above flowcharts can be executed by one apparatus or can be shared and executed by a plurality of apparatuses.

Moreover, in a case where a plurality of processes is included in one step, the plurality of processes included in the one step can be executed by one apparatus or can be shared and executed by a plurality of apparatuses.

Note that the present disclosure may also adopt the following configurations.

<1> An information processing apparatus including:
an image acquisition unit configured to acquire an image of an operation surface from above, the operation surface being configured to accept a hand-based operation input from users;
a hand detector configured to detect left and right hands of the users and arms corresponding to the hands from the image; and
a pairing unit configured to perform pairing of the left and right hands detected by the hand detector in the image for each of the users.

<2> The information processing apparatus according to <1>, in which
the pairing unit is configured to set any one of the hands detected by the hand detector as a benchmark hand, set a base position of the arm of the benchmark hand as a benchmark position, set a base position of the arm closest adjacent to the benchmark position in a direction depending on whether the benchmark hand is a left hand or a right hand as a reference position, and set the hand of the arm of which the base position is set as the reference position and the hand of the arm of which the base position is set as the benchmark position as a pair of the left and right hands of a same one of the users.

<3> The information processing apparatus according to <2>, in which
the pairing of the left and right hands for each of the users in the image is performed by setting a base position of the arm closest adjacent to the reference position in the direction depending on whether the benchmark hand is a left hand or a right hand as a new benchmark position, setting a new reference position with respect to the new benchmark position, setting the hand of the arm of which the base position is set as the new benchmark position and the hand of the arm of which the base position is set as the new reference position as a pair of the left and right hands of a new same one of the users, and subsequently repeatedly performing similar processing.

<4> The information processing apparatus according to <2>, in which
the pairing unit is configured to set a base position of the arm of any one of the left hands detected by the hand detector as the benchmark position, set a base position of the arm closest adjacent to the benchmark position in a counterclockwise direction along a periphery of the operation surface as the reference position, and set the left hand of the arm of which the base position is set as the benchmark position and the right hand of the arm of which the base position is set as the reference position as a pair of the left and right hands of a same one of the users.

<5> The information processing apparatus according to <2>, in which
the pairing unit is configured to set a base position of the arm of any one of the right hands detected by the hand detector as the benchmark position, set a base position of the arm of the left hand closest adjacent to the benchmark position in a clockwise direction along a periphery of the operation surface as the reference position, and set the right hand of the arm of which the base position is set as the benchmark position and the left hand of the arm of which the base position is set as the reference position as a pair of the left and right hands of a same one of the users.

<6> The information processing apparatus according to <2>, in which
in a case where both the hand of the arm of which the base position is set as the reference position and the hand of the arm of which the base position is set as the benchmark position are right hands or left hands, the pairing unit is configured to set the hand of the arm of which the base position is set as the reference position and the hand of the arm of which the base position is set as the benchmark position as respective independent pairs each associated with only the right hand or only the left hand of one of the users.

<7> The information processing apparatus according to <2>, in which
in a case where a distance between the reference position and the benchmark position is longer than a predetermined distance, the pairing unit is configured to set the hand of the arm of which the base position is set as the reference position and the hand of the arm of which the base position is set as the benchmark position as respective independent pairs each associated with only the right hand or only the left hand of one of the users.

<8> The information processing apparatus according to <7>, in which the predetermined distance is a distance along outstretched arms of a human.

<9> The information processing apparatus according to any one of <1> to <8>, further including:

a gesture recognition unit configured to recognize a gesture made with at least any one of the left hand and the right hand set as a pair by the pairing unit; and a command definition unit configured to define a command corresponding to the gesture recognized by the gesture recognition unit.

<10> The information processing apparatus according <9>, in which the gesture recognition unit is configured to recognize, as the gesture, information about a trajectory according to a movement of a finger of one of the left hand and the right hand set as the pair of the left and right hands of a same one of the users, and information about a palm shape of another one of the left hand and the right hand.

<11> The information processing apparatus according to <10>, in which the command definition unit is configured to define the command corresponding to the gesture recognized by the gesture recognition unit as a command to display a drawing drawn with a writing instrument corresponding to the information about the palm shape, the drawing corresponding to the information about the trajectory.

<12> The information processing apparatus according to <11>, in which the writing instrument includes any of a brush and a marker.

<13> The information processing apparatus according to <9>, in which the gesture recognition unit is configured to recognize, as the gesture, information about a finger touching the operation surface, the finger belonging to one of the left hand and the right hand set as the pair of the left and right hands of a same one of the users, and information about a flick direction of a finger of another one of the left hand and the right hand.

<14> The information processing apparatus according to <13>, in which the command definition unit is configured to define the command corresponding to the gesture recognized by the gesture recognition unit as a command to accept an input of a character identified by a consonant corresponding to the information about the finger touching the operation surface and a vowel corresponding to the information about the flick direction.

<15> The information processing apparatus according to <9>, in which the gesture recognition unit is configured to recognize, as the gesture, information about respective trajectories of at least two fingers of the left hand and the right hand set as the pair of the left and right hands of a same one of the users, the fingers moving in a state of touching an image displayed on the operation surface.

<16> The information processing apparatus according to <15>, in which the command definition unit is configured to define the command corresponding to the gesture recognized by the gesture recognition unit as a command to enlarge or reduce the image for display depending on a distance between the two fingers.

<17> The information processing apparatus according to <9>, in which the gesture recognition unit is configured to recognize, as the gesture, information about respective trajectories of fingers of the hands set as the pairs each associated with only a left hand or only a right hand of a different user, at least one finger of the different user moving in a state of touching an image displayed on the operation surface.

<18> The information processing apparatus according to <17>, in which the command definition unit is configured to define the command corresponding to the gesture recognized by the gesture recognition unit as a command to copy the image for display on the trajectory of the at least one finger of the different user.

<19> An information processing method including:

an image acquisition process of acquiring an image of an operation surface from above, the operation surface being configured to accept a hand-based operation input from users;

a hand detection process of detecting left and right hands of the users and arms corresponding to the hands from the image; and a pairing process of performing pairing of the left and right hands detected by the hand detection process in the image for each of the users.

<20> A program that causes a computer to function as:

an image acquisition unit that acquires an image of an operation surface from above, the operation surface being configured to accept a hand-based operation input from users;

a hand detector that detects left and right hands of the users and arms corresponding to the hands from the image; and a pairing unit that performs pairing of the left and right hands detected by the hand detector in the image for each of the users.

REFERENCE SIGNS LIST

11 Information processing system
31 Input unit
32 Information processing apparatus
33 Output unit
71 Table
51 Hand detector
52 Pairing unit
53 Three-dimensional position estimation unit
54 Frame quantity determination unit
55 Relative position/relative speed calculator
56 Gesture recognition unit
57 Command execution unit
58 Storage unit

The invention claimed is:

1. An information processing apparatus, comprising:
   circuitry configured to:
      acquire, from a camera, an image of an operation surface from above, wherein the operation surface is configured to accept a hand-based operation input from users;

detect left and right hands of the users and arms corresponding to the left and right hands, from the image;

set one of the detected left and right hands as a benchmark hand;

set a base position of an arm of the benchmark hand as a benchmark position;

set a base position of an arm closest adjacent to the benchmark position in a direction based on whether the benchmark hand is a left hand or a right hand as a reference position; and set the hand of the arm of which the base position is set as the reference position and the hand of the arm of which the base position is set as the benchmark position as a pair of the left and right hands of a first user of the users.

2. The information processing apparatus according to claim 1, wherein the pairing of the left and right hands for each of the users in the image is performed by setting a base position of an arm closest adjacent to the reference position in the direction depending on whether the benchmark hand is the left hand or the right hand as a new benchmark position, setting a new reference position with respect to the new benchmark position, setting a hand of the arm of which the base position is set as the new benchmark position and a hand of the arm of which the base position is set as the new reference position as a pair of the left and right hands of a second user of the users, and subsequently repeatedly performing similar processing.

3. The information processing apparatus according to claim 1, wherein the circuitry is further configured to:

set a base position of the arm of the left hand as the benchmark position, set a base position of the arm of the right hand closest adjacent to the benchmark position in a counterclockwise direction along a periphery of the operation surface as the reference position, and set the left hand of the arm of which the base position is set as the benchmark position and the right hand of the arm of which the base position is set as the reference position as a pair of the left and right hands of the first user the users.

4. The information processing apparatus according to claim 1, wherein the circuitry is further configured to:

set a base position of the arm of the right hand as the benchmark position, set a base position of the arm of the left hand closest adjacent to the benchmark position in a clockwise direction along a periphery of the operation surface as the reference position, and set the right hand of the arm of which the base position is set as the benchmark position and the left hand of the arm of which the base position is set as the reference position as a pair of the left and right hands of the first user of the users.

5. The information processing apparatus according to claim 1, wherein in a case where both the hand of the arm of which the base position is set as the reference position and the hand of the arm of which the base position is set as the benchmark position are one of right hands or left hands, the circuitry is further configured to set the hand of the arm of which the base position is set as the reference position and the hand of the arm of which the base position is set as the benchmark position as respective independent pairs each associated with only the right hand or only the left hand of one of the users.

6. The information processing apparatus according to claim 1, wherein in a case where a distance between the reference position and the benchmark position is longer than a specific distance, the circuitry is further configured to set the hand of the arm of which the base position is set as the reference position and the hand of the arm of which the base position is set as the benchmark position as respective independent pairs each associated with only the right hand or only the left hand of one of the users.

7. The information processing apparatus according to claim 6, wherein the specific distance is a distance along outstretched arms of a human.

8. The information processing apparatus according to claim 1, wherein circuitry is further configured to recognize a gesture made with at least one of the left hand and the right hand set as a pair; and define a command corresponding to the recognized gesture.

9. The information processing apparatus according to claim 8, wherein the circuitry is further configured to recognize, as the gesture, information about a trajectory according to a movement of a finger of one of the left hand and the right hand set as the pair of the left and right hands of the first user of the users, and information about a palm shape of another one of the left hand and the right hand.

10. The information processing apparatus according to claim 9, wherein the circuitry is further configured to define the command corresponding to the recognized gesture as a command to display a drawing drawn with a writing instrument corresponding to the information about the palm shape, the drawing corresponding to the information about the trajectory.

11. The information processing apparatus according to claim 10, wherein the writing instrument includes one of a brush or a marker.

12. The information processing apparatus according to claim 8, wherein the circuitry is further configured to recognize, as the gesture, information about a finger touching the operation surface, the finger belonging to one of the left hand and the right hand set as the pair of the left and right hands of the first user of the users, and information about a flick direction of a finger of another one of the left hand and the right hand.

13. The information processing apparatus according to claim 12, wherein the circuitry is further configured to define the command corresponding to the recognized gesture as a command to accept an input of a character identified by a consonant corresponding to the information about the finger touching the operation surface and a vowel corresponding to the information about the flick direction.

14. The information processing apparatus according to claim 8, wherein the circuitry is further configured to recognize, as the gesture, information about respective trajectories of at least two fingers of the left hand and the right hand set as the pair of the left and right hands of the first user of the users, the two fingers moving in a state of touching an image displayed on the operation surface.

15. The information processing apparatus according to claim 14, wherein
the circuitry is further configured to define the command corresponding to the recognized gesture as a command to enlarge or reduce the image for display depending on a distance between the two fingers.

16. The information processing apparatus according to claim 8, wherein
the circuitry is further configured to recognize, as the gesture, information about respective trajectories of fingers of the left and right hands set as the pairs each associated with only a left hand or only a right hand of a second user, at least one finger of the second user moving in a state of touching an image displayed on the operation surface.

17. The information processing apparatus according to claim 16, wherein
the circuitry is further configured to define the command corresponding to the recognized gesture as a command to copy the image for display on the trajectory of the at least one finger of the second user.

18. An information processing method, comprising:
acquiring an image of an operation surface from above, wherein the operation surface is configured to accept a hand-based operation input from users;
detecting left and right hands of the users and arms corresponding to the left and right hands, from the image;
setting one of the detected left and right hands as a benchmark hand;
setting a base position of an arm of the benchmark hand as a benchmark position;
setting a base position of an arm closest adjacent to the benchmark position in a direction based on whether the benchmark hand is a left hand or a right hand as a reference position; and
setting the hand of the arm of which the base position is set as the reference position and the hand of the arm of which the base position is set as the benchmark position as a pair of the left and right hands of a first user of the users.

19. A non-transitory computer-readable medium having stored thereon, computer-executable instructions which, when executed by a computer, cause the computer to execute operations, the operations comprising:
acquiring an image of an operation surface from above, wherein the operation surface is configured to accept a hand-based operation input from users;
detecting left and right hands of the users and arms corresponding to the left and right hands, from the image;
setting one of the detected left and right hands as a benchmark hand;
setting a base position of an arm of the benchmark hand as a benchmark position;
setting a base position of an arm closest adjacent to the benchmark position in a direction based on whether the benchmark hand is a left hand or a right hand as a reference position; and
setting the hand of the arm of which the base position is set as the reference position and the hand of the arm of which the base position is set as the benchmark position as a pair of the left and right hands of a first user of the users.

* * * * *